US 12,033,083 B2

(12) United States Patent
Gong et al.

(10) Patent No.: US 12,033,083 B2
(45) Date of Patent: Jul. 9, 2024

(54) SYSTEM AND METHOD FOR MACHINE LEARNING ARCHITECTURE FOR PARTIALLY-OBSERVED MULTIMODAL DATA

(71) Applicant: ROYAL BANK OF CANADA, Toronto (CA)

(72) Inventors: Yu Gong, Vancouver (CA); Jiawei He, Vancouver (CA); Thibaut Durand, Vancouver (CA); Megha Nawhal, Vancouver (CA); Yanshuai Cao, Toronto (CA); Gregory Mori, Vancouver (CA); Seyed Hossein Hajimirsadeghi, Vancouver (CA)

(73) Assignee: ROYAL BANK OF CANADA, Toronto (CA)

( * ) Notice: Subject to any disclaimer, the term of this patent is extended or adjusted under 35 U.S.C. 154(b) by 483 days.

(21) Appl. No.: 16/882,074

(22) Filed: May 22, 2020

(65) Prior Publication Data

US 2020/0372369 A1 Nov. 26, 2020

Related U.S. Application Data

(60) Provisional application No. 62/851,444, filed on May 22, 2019.

(51) Int. Cl.
*G06N 3/088* (2023.01)
*G06N 3/042* (2023.01)
*G06N 3/045* (2023.01)

(52) U.S. Cl.
CPC ............ *G06N 3/088* (2013.01); *G06N 3/042* (2023.01); *G06N 3/045* (2023.01)

(58) Field of Classification Search
CPC .... G06N 3/088; G06N 3/0427; G06N 3/0454; G06N 3/0472; G06N 3/0481
See application file for complete search history.

(56) References Cited

U.S. PATENT DOCUMENTS

| | | | | |
|---|---|---|---|---|
| 6,502,082 | B1 * | 12/2002 | Toyama | G06T 7/246 |
| | | | | 706/15 |
| 2005/0265607 | A1 * | 12/2005 | Chang | G06F 18/256 |
| | | | | 382/224 |
| 2011/0125699 | A1 * | 5/2011 | D'Ambrosio | G06Q 10/06 |
| | | | | 706/50 |

(Continued)

OTHER PUBLICATIONS

Matthias Aßenmacher, Multimodal Deep Learning, arXiv:2301.04856v1 [cs.CL], Jan. 12, 2023.

(Continued)

*Primary Examiner* — Michael N Opsasnick
(74) *Attorney, Agent, or Firm* — Norton Rose Fulbright Canada LLP

(57) ABSTRACT

Variational Autoencoders (VAEs) have been shown to be effective in modeling complex data distributions. Conventional VAEs operate with fully-observed data during training. However, learning a VAE model from partially-observed data is still a problem. A modified VAE framework is proposed that can learn from partially-observed data conditioned on the fully-observed mask. A model described in various embodiments is capable of learning a proper proposal distribution based on the missing data. The framework is evaluated for both high-dimensional multimodal data and low dimensional tabular data.

20 Claims, 9 Drawing Sheets

(56) References Cited

U.S. PATENT DOCUMENTS

| | | | | |
|---|---|---|---|---|
| 2014/0161354 A1* | 6/2014 | Curcio | ............... | G06V 20/41 |
| | | | | 382/190 |
| 2015/0243276 A1* | 8/2015 | Cooper | ............... | G11B 27/28 |
| | | | | 704/251 |
| 2016/0001096 A1* | 1/2016 | Mishelevich | ............ | A61N 7/02 |
| | | | | 601/2 |
| 2018/0032845 A1* | 2/2018 | Polak | ............... | G06F 18/2411 |
| 2018/0204111 A1* | 7/2018 | Zadeh | ............... | G06F 18/2413 |
| 2019/0018933 A1* | 1/2019 | Oono | ............... | G06N 3/045 |
| 2019/0236450 A1* | 8/2019 | Li | ............... | G06N 3/045 |
| 2019/0347523 A1* | 11/2019 | Rothberg | ............ | G06N 3/088 |
| 2019/0384235 A1* | 12/2019 | Eck | ............... | H02J 13/00022 |
| 2020/0160042 A1* | 5/2020 | Bui | ............... | G06V 40/20 |
| 2021/0383538 A1* | 12/2021 | Deasy | ............... | A61B 6/5211 |

OTHER PUBLICATIONS

Andreas Veit et al., Separating Self-Expression and Visual Content in Hashtag Supervision, arXiv:1711.09825v1 [cs.CV], Nov. 27, 2017.

Jinsung Yoon et al., Gain: Missing Data Imputation using Generative Adversarial Nets, https://arxiv.org/abs/1806.02920, Jun. 7, 2018.

Steven Cheng-Xian Li et al., Misgan: Learning From Incomplete Data With Generative Adversarial Networks, arXiv: 1902.09599v1 [cs.LG], Feb. 25, 2019.

Oleg Ivanov et al., Variational Autoencoder With Arbitrary Conditioning, arXiv: 1806.02382v3 [stat.ML], Jun. 27, 2019.

Diederik P. Kingma et al., Auto-Encoding Variational Bayes, arXiv:1312.6114v11 [stat.ML], Dec. 10, 2022.

Kihyuk Sohn et al., Learning Structured Output Representation using Deep Conditional Generative Models, 2015.

Amir Zadeh et al., Tensor Fusion Network for Multimodal Sentiment Analysis, arXiv:1707.07250v1 [cs.CL], Jul. 23, 2017.

Wang Hao et al., Learning Cross-Modal Embeddings with Adversarial Networks for Cooking Recipes and Food Images, arXiv: 1905.01273v1 [cs.CV], May 3, 2019.

Ying Zhang et al., Deep Cross-Modal Projection Learning for Image-Text Matching, https://link.springer.com/conference/eccv, 2018.

Yao-Hung Hubert Tsai et al., Learning Factorized Multimodal Representations, arXiv: 1806.06176v3 [cs.LG], May 14, 2019.

Yuhang Song et al., Contextual-based Image Inpainting: Infer, Match, and Translate, arXiv: 1711.08590v5 [cs.CV], Jul. 25, 2018.

Amir Zadeh et al., Variational Auto-Decoder: A Method for Neural Generative Modeling from Incomplete Data, arXiv: 1903.00840v6 [cs.LG], Jan. 3, 2021.

Diederik P. Kingma et al., Semi-supervised Learning with Deep Generative Models, arXiv: 1406.5298v2 [cs.LG], Oct. 31, 2014.

Hong-Min Chu et al., Deep Generative Models forWeakly-Supervised Multi-Label Classification, https://link.springer.com/conference/eccv, 2018.

Casper Kaae Sønderby at al., Ladder Variational Autoencoders, 30th Conference on Neural Information Processing Systems (NIPS 2016), Barcelona, Spain, 2016.

Jiawei He et al., Variational Autoencoders With Jointly Optimized Latent Dependency Structure, Published as a conference paper at ICLR, 2019.

Alfredo Nazabal et al., Handling Incomplete Heterogeneous Data using VAEs, arXiv:1807.03653v4 [cs.LG], May 22, 2020.

Vikas Jain et al., Scalable Generative Models for Multi-label Learning with Missing Labels, Proceedings of the 34th International Conference on Machine Learning, PMLR 70:1636-1644, 2017.

Yaroslav Ganin et al., Domain-Adversarial Training of Neural Networks, arXiv: 1505.07818v4 [stat.ML], May 26, 2016.

Taeksoo Kim et al., Learning to Discover Cross-Domain Relations with Generative Adversarial Networks, arXiv: 1703.05192, Mar. 15, 2017.

Jun-Yan Zhu et al., Unpaired Image-to-Image Translation using Cycle-Consistent Adversarial Networks, arXiv: 1703.10593v7 [cs.CV], Aug. 24, 2020.

Lluis Castrejon et al., Learning Aligned Cross-Modal Representations fromnWeakly Aligned Data, arXiv: 1607.07295v1 [cs.CV], Jul. 25, 2016.

Marc-André Carbonneau et al., Multiple Instance Learning: A Survey of Problem Characteristics and Applications, arXiv: 1612.03365v1 [cs.CV], Dec. 11, 2016.

Ishan Misra et al., Cross-stitch Networks for Multi-task Learning, arXiv: 1604.03539v1 [cs.CV], Apr. 12, 2016.

Yu Zhang et al., Learning to Multitask, 32nd Conference on Neural Information Processing Systems (NeurIPS 2018), Montréal, Canada, 2018.

* cited by examiner

SYSTEM AND METHOD FOR MACHINE LEARNING ARCHITECTURE FOR PARTIALLY-OBSERVED MULTIMODAL DATA

CROSS REFERENCE

This application claims all benefit to, and is a non-provisional of, U.S. application Ser. No. 62/851,444, filed 22 May 2019, entitled "SYSTEM AND METHOD FOR MACHINE LEARNING ARCHITECTURE FOR PARTIALLY-OBSERVED MULTIMODAL DATA", incorporated herein by reference in its entirety.

FIELD

Embodiments of the present disclosure generally relate to the field of machine learning architectures, and more specifically, embodiments relate to devices, systems and methods for conducting machine learning on partially-observed data using a proposed architecture for machine learning.

INTRODUCTION

Learning from data is an objective of artificial intelligence. Learning algorithms often rely heavily on clean homogeneous data, whereas in the real world, data is filled with noisy heterogeneous data. Heterogeneity is ubiquitous in a variety of applications and platforms from healthcare and finance to social networks and manufacturing systems. For example, the profile of users or clients in the electronic platforms can be characterized by heterogeneous data of various types, including numbers (e.g., age and height), labels or tags (e.g., gender), text (e.g., bio), and images (e.g., profile picture). Likewise, in manufacturing systems, data are collected from different measurement tools with different recording mechanisms. It is also known that missing values are more common in these applications due to heterogeneity of sources. Deep generative models have been shown to be effective in a variety of homogeneous data representation learning tasks. However, learning these computational models from heterogeneous data introduces new technical challenges.

SUMMARY

A machine learning architecture and related technical computing approaches are proposed in various embodiments herein, referred to as the proposed variational selective autoencoder. The architecture is adapted to address technical problems associated from learning from incomplete heterogeneous/multimodal data sets that can be encountered in real-life practical implementations. Incomplete data can be due to missing data, in some variants, or in other variants, polluted data, or a mixture of both). The approaches are not limited to just heterogeneous/multimodal data sets, and can be applicable to unimodal data sets, among others. Incompleteness can be exhibited, for example, in a lack of labels. In some situations, incompleteness is on purpose—it may be unduly expensive to caption all of a video, for example, so only the most important sections are captioned.

The approach described herein relates to an improved mechanism for representation learning from incomplete (partially-observed data) that is improved relative to other approaches, such as simply concatenating all of the inputs and providing it into a model. As described herein, specific embodiments are described relating to a specific topology whereby a number of different proposal networks and generative networks operate in concert. This topology is flexible and can be used where there is a level of missingness of the input data, and has practical uses in the context of technical problems encountered with real-world incomplete data sets.

In an embodiment, the architecture can be trained to computationally impute new data to augment the missing data from the observed data (e.g., computationally applying a framework for conditional generation of unobserved attributes). A computational mask data structure (e.g., M-dimensional binary mask variable, but variations are possible) is generated that is utilized for representing the "missingness". In another embodiment, other tasks are possible, such as mask generation (e.g., where the "missingness" is represented, such as where the data is otherwise polluted).

The incompleteness of the heterogeneous or multimodal data sets can be due to a lack of resources for conducting labelling operations (e.g., the cost for labelling increases significantly with every dimension to be labelled, which is a problem for extremely large data sets), data pollution/data noise (e.g., unreliable data may have to be discarded), incomplete entry (e.g., data entered by individuals), unavailability (e.g., individuals may enter some data but not others), among others. Data pollution can happen, for example, where data is incorrectly entered, falsified data is entered on purpose (e.g., false email addresses such as fake@fake.com), placeholders are often used (e.g., phone numbers with 555 area codes). Data pollution can be tracked and flagged, for example, through validation filter rulesets, etc.

The machine learning architecture and related technical computing approaches proposed in various embodiments herein provide a technical mechanism that can be trained to generate predicted inputs (e.g., labels) that can be used to "fill in" the missing inputs or to establish a mask representing the "missingness" where the data is polluted, or conduct tasks such as mask generation.

Determining missing inputs is a difficult, non-trivial exercise as there are many different options that can be utilized, in some instances. Computationally obtaining complete inputs is subject to availability of processing power/resources, and it is desirable to obtain as much accuracy as possible, for example, over a finite number of training iterations ("epochs"). There are only so much computing resources and computing time available, so an efficient approach is useful to improve accuracy insofar as possible before the resources are consumed. In some embodiments, the missing inputs can be missing labels (e.g., consider labels as a new input modality and train the model. For example, in Fashion MNIST experimentation, the approach used image+label as 2 modalities). Applicants conducted experimentation to validate technical benefits of some of the embodiments described herein.

Accordingly, the machine learning architecture is trained over training iterations to provide a trained model, which can then be stored for later usage, or deployed for generating predicted inputs. The predicted inputs can be used to "fill in" the missing inputs of the training data set ("incomplete data synthesis"), or in other embodiments, be utilized for similar data sets for similarly generating predicted inputs to help fill in the similar data set (e.g., deployment on data sets in similar domains). In another embodiment, the trained machine learning architecture is utilized instead to generate potential mask data structures, for example, where the exact mask is not available (e.g., when data is polluted rather than missing). The machine learning architecture, for example, can be implemented using neural networks, or other types of machine learning mechanisms, according to various embodiments.

The proposed machine learning architecture is directed to a deep latent variable data model architecture for representation learning from heterogeneous incomplete data. A specific computational architecture is proposed that Applicant has experimentally validated for some embodiments in respect of both lower dimensional data and higher-dimensional data under various missing mechanisms. The proposed machine learning architecture learns individual encoders (e.g., an attributive proposal network) for observed attributes, and a collective encoder (e.g., a collective proposal network) for unobserved attributes. The latent codes representing each attribute are then aggregated and provided to decoders to reconstruct a mask (e.g., using a mask generative network) and all attributes independently. The latent codes and the generated mask are provided to a data generative network to sample the attributes.

The architecture was compared against benchmark computing architectures on benchmark data sets (e.g., Fashion MNIST+label, MNIST+MNIST, CMU-MOSI), and was found to yield technical benefits and improvements, including improved computational accuracy (e.g., improved mean square error scores, shown both in mean and standard deviations over independent runs).

The approaches described herein can operate for various types of incompleteness. For example, in some embodiments, the "missingness" of the data can be completely at random, while in other embodiments, the "missingness" of the data is not missing at random. For example, for weather data, weather data that is missing at random may include data lost to random noise. On the other hand, weather data that is not missing at random can include data over specific geographic regions having heightened sensitivity, such as North Korea, military installations, among others, or locations where there simply are no weather data collecting stations (e.g., middle of the ocean). Being able to flexibly handle incomplete data that is either missing at random or not missing at random is an improved aspect of some embodiments that allows for compatibility with more variations of incomplete input data sets. In the weather data example above, the input data can be used without regard to whether the data is missing completely at random or not.

In an aspect, the machine learning data architecture engine is further adapted to maintain a second generative network including a second set of one or more decoders, each decoder of the second set of the one or more decoders configured to generate new masks that can be applied to the output estimated heterogeneous or multimodal data such that the masked output estimated heterogeneous or multimodal data approximates a level of masking in the received one or more heterogeneous or multimodal data sets.

In an aspect, the output estimated heterogeneous or multimodal data includes estimated values corresponding to at least one unobserved modality and the output estimated heterogeneous or multimodal data can be combined with the partially-observed heterogeneous or multimodal data.

In an aspect, the output estimated heterogeneous or multimodal data is a new set of generated heterogeneous or multimodal data sets.

In an aspect, the output estimated heterogeneous or multimodal data is a new set of generated heterogeneous or multimodal data sets and the new masks, each of the new masks having a corresponding heterogeneous or multimodal data set such that each of the new masks can be used to identify a first subset of modalities as observed and a second subset of modalities as unobserved.

In an aspect, the one or more heterogeneous or multimodal data sets representative of the partially-observed heterogeneous or multimodal data includes high-dimensional heterogeneous or multimodal data.

In an aspect, the one or more heterogeneous or multimodal data sets representative of the partially-observed heterogeneous or multimodal data includes low dimensional tabular data.

In an aspect, the mask data structure is an array of Boolean variables, each Boolean variable having a corresponding modality.

The system can be provided in the form of a computer server or a computing service operating thereon a computer server that can be accessed by various downstream and upstream systems and data sources. Information in the form of data sets can be provided at various levels of missingness (e.g., 20% missing, 50% missing, 80% missing). The system can process the input data sets, and be configured to generate imputed outputs, such as imputed/completed versions of the data sets, or providing data structures representative of a mask showing characteristics of the missingness (e.g., useful where the data is polluted).

The system can be interoperated with, for example, through various application programming interfaces (APIs), whereby data sets are provided through upload or data stream and an output data set is returned. The output data set can be imputed data, or an output mask data set. Not all embodiments necessarily need to be an API, in a variant, the approach can also be encapsulated or implemented as instructions residing within a programming library (e.g., on non-transitory, computer readable media storing instructions for execution by a processor), which can be statically or dynamically called when required to provide a computational mechanism for providing aid when an input data set is determined or flagged to be incomplete. In these embodiments, if there is any information relating to the missingness, this information can also be passed along for computation (e.g., missing at random, not missing at random).

For example, in the context of a financial services data implementation, incomplete client information can be received as a comma separated values (CSV) file. The data can be incomplete, for example, because the user banks with multiple banks, or has information stored in other departments whose information is not accessible. The provided output can be a filled in CSV file, where, for example, imputed information is utilized to complete the data set. In some embodiments, the imputed information is flagged (e.g., using metadata or an associated dimension) to distinguish it from the observed information. In some further embodiments, the flagging includes associating a confidence score. Similarly, incomplete databases can be provided, and the system can generate output complete databases. In some embodiments, the complete databases have additional rows or columns indicating additional metadata as to a confidence score or a flag indicating that certain data is imputed.

In another example, the system can be used in relation to caption generation (e.g., for audio, for video). In this example, captions are provided in relation to parts of a video but not for the rest of the video. This example relates to multimodal data. In this example, there are different modes, such as image, text, sound, etc. The system can impute the rest of the captions that were not observed, for example, by using information from other modalities (video data, such as "the cat is walking across the screen", or speech in the audio channel. In this example, the generation of imputed data can be used to reduce an overall cost for generating labels or annotations where it can be fairly time intensive or costly to prepare.

Another example of multimodal imputation can include usage with multimodal data sets, such as Fashion MNIST, where data is incomplete (e.g., given an image, a label can be generated or vice versa).

In further variants, any other task that could be solved by representation learning models could be also solved by the model (e.g. feature extraction, dimensionality reduction, anomaly detection, distribution estimation).

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
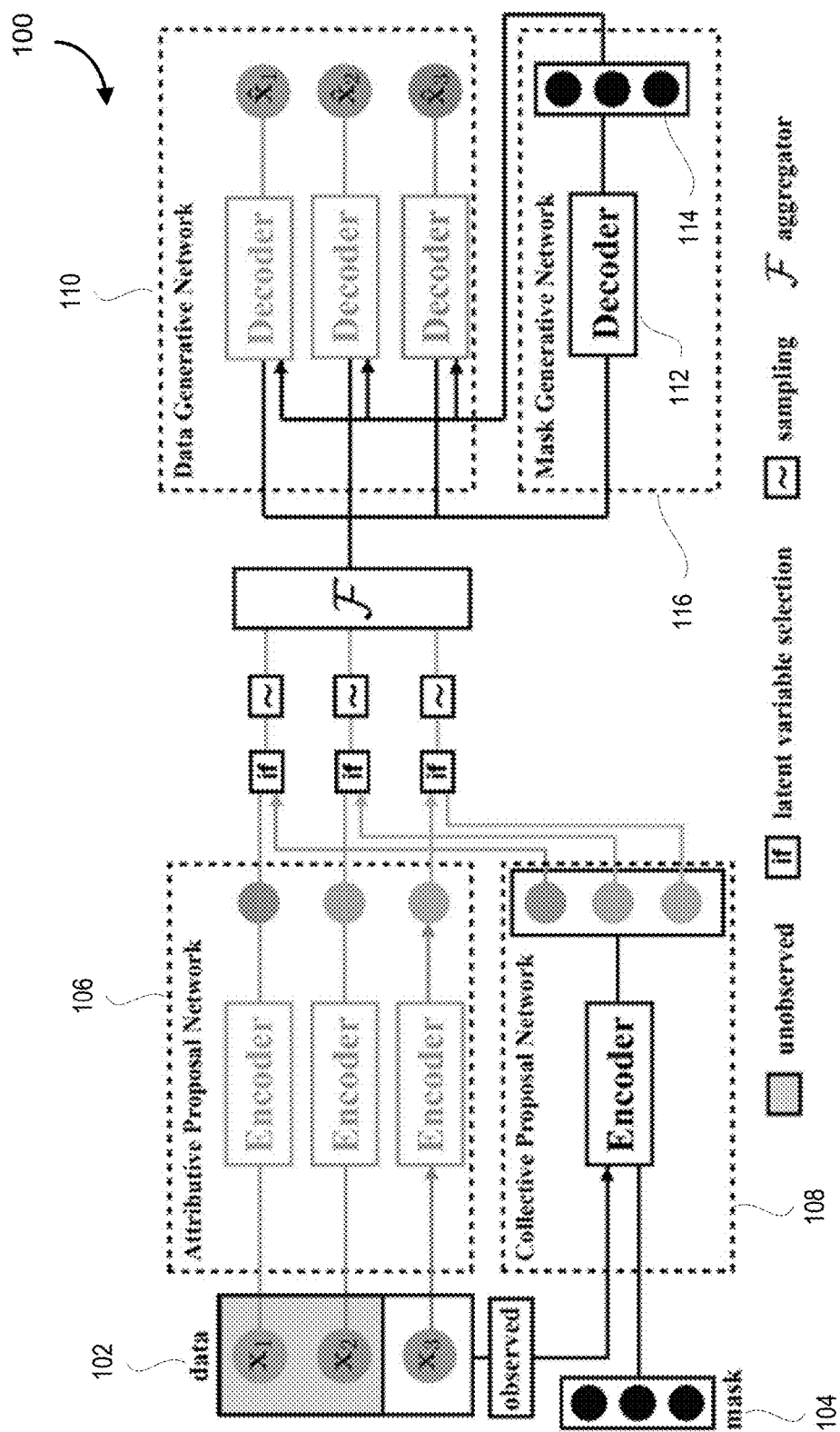
FIG. 1 is a block schematic diagram of a systems architecture, according to some embodiments.

As described herein, a Variational Selective Autoencoder (VSAE) is proposed to tackle the technical problems arising from learning from partially-observed data, such as heterogeneous or multi-modal data. Data can be unimodal, multimodal, homogeneous, or heterogeneous, as noted in variant embodiments herein.

The definition of heterogeneity used herein spans a wide range of forms from data type to data distribution to data source or modality. For example, one may have categorical or numerical attributes, mixed variables from different distributions, or mixed modalities representing image, text and audio.

A technical challenge that is presented is how to align and integrate the partially-observed data to model the joint distribution. As proposed herein, the proposed latent variable model is a technical approach that handles this challenge effectively by selecting appropriate proposal distribution and performing the integration in the latent space instead of the input space. Learning from partially-observed data is another challenge in deep generative models. Naïve solutions to deal with missing data such as ignoring or zero-imputing will likely degrade performance by introducing sparsity bias.

Having a model designed to learn from incomplete data not only increases the application spectrum of deep learning algorithms, but also benefits down-stream tasks such as data imputation, which has recently been an active topic by employing deep generative models. Accordingly, the approaches described herein are utilized to yield computational improvements in respect of generating improved trained machine learning architectures, which can then be deployed to automatically generate imputed data sets and/or mask data structures in respect to input data sets that otherwise have technical challenges associated with data incompleteness and data pollution.

Generative modeling is to learn a probabilistic distribution p(x) which is complex enough to fit the data x. One needs to sample from the generative distribution of the data to impute the missing entries while the generative distribution is learned if the model is given the full data with missing information. This conflict makes it challenging to learn a generative model from incomplete data. Previous works on generative data imputation are mainly based on GAN or VAE models.

For GAN frameworks, alternate approaches introduced a data generator accompanied with a mask discriminator to determine which components were actually observed and which were imputed for low-dimensional tabular data. In another approach, there is proposed a framework with an auxiliary mask generator and outperformed on unimodal data imputation task. For previous VAE-based methods, another approach presented a model to impute missing entries conditioned on the observed entries following conditional VAE and cannot hold for partially-observed data within this conditional VAE framework. However, the performance of existing models are still far from satisfactory. Some prior works require fully-observed data for training.

Additionally, most previous methods gamble on a restrictive assumption on missingness mechanism that data is missing completely at random (MCAR). MCAR assumes missingness (the manner that data are missing) occurs independent of data. However, the proposed method of some embodiments herein relaxes this technical assumption by learning the joint distribution of data and imputation mask (which denotes missingness pattern). Accordingly, a broader range of technical challenges can be addressed, not limited solely to MCAR (e.g., addressing incomplete data sets where data is not missing at random).

The missingness in the high-dimensional multi-modal data can be intra-modality and/or inter-modality. For intra-modality incomplete data, the missing features are within one modality or attribute, and the target is to impute the missing entries given the observed entries in a single attribute like image inpainting. However, in a more realistic scenario, the missingness in the high-dimensional multi-modal data is more likely to follow an inter-modality way. This is common in high-dimensional multimedia data. On social media, users' behaviour depends on their posts which include one or multiple attributes from image, audio, video, caption or utterance. Those attributes may be mutually correlated in some way and usually collected in an incomplete way with some missing attributes. Only when one is aware of what the user might tag on a given image or post some images based on certain tags, an approach may attempt to understand the user's behavior.

Low-dimensional tabular data imputation can be also viewed as a multi-modal imputation that the feature dimension in the missing modalities are quite low, and may even be scalar. Similar to bank consumer records, different subjects have different missing attributes and those attributes are either totally missing or fully-observed. This inevitable data missing problem is encountered in many of the realistic scenarios and makes it challenging to train the model with those data.

Learning from Partially Observed Data, such as Heterogeneous or Multi-Modal Data Existing approaches for modeling statistical dependencies in unstructured heterogeneous data focus on obtaining alignments and subsequently modeling relationships between different domains. However, there has been little progress on learning joint distribution of the full data comprising different domains.

Other methods handle heterogeneity in labels or datasets in weakly-supervised learning settings. For example, multi-instance learning deals with the scenarios where the instances can be decomposed into heterogeneous labels, and multi-task learning focuses on handling heterogeneity coming from multiple datasets which have different data distributions. In contrast to these methods that are limited to a single type of heterogeneity in data, this work focuses on modeling all types of heterogeneity and demonstrate the effectiveness in data generation and imputation applications.

Multimodal machine learning is a crucial research area for many realistic problems. Learning from data across multiple modalities such as visual, linguistics and acoustic modalities, models must satisfy the following properties: (1) Learn the complex intra-modal and cross-modal interactions for prediction; (2) Be robust to unexpected missing or noisy modalities during testing. Multimodal data is more uncertain and unstructured than unimodal data and the model needs to combine different information effectively. Thus, to capture the data dynamics, both intra-modality and inter-modality dynamics should be well modeled. Previous works in multimodal learning are achieved by either early fusion or late fusion, respectively better for inter-modality and intra-modality.

For high-dimensional multimedia data like user posting, audible video with caption and etc., it is obviously multi-modal data. As described in some embodiments, Applicants also regard the low-dimensional (more commonly one-dimensional) tabular data as multimodal data. The modality here is the one single attribute in such tabular data, e.g. there are many different types of attributes in patient records like gender, age, the history of allergies, symptoms and etc. These attributes has different data type and the missingness is always for the whole attribute instead of the part of the attributes.

Learning from Partially-Observed Data

Classical methods dealing with missing data such as MICE and MissForest typically learn discriminative models to impute missing features from observed ones. Advanced by deep neural networks, several models have also been developed to address data imputation based on autoencoders, generative adversarial networks (GANs), and autoregressive models. GAIN, as a GAN-based method, assumes data are MCAR and does not scale to high-dimensional multi-modal data. MisGAN handles incomplete observations by learning a complete data generator along with a mask generator. Unlike GAN based frameworks, deep latent variable models explicitly model the density of the data distribution. In this work, improved deep latent variable models are proposed (specifically variational autoencoder (VAE)) to efficiently learn from partially-observed heterogeneous data.

Ivanov et al. formulated VAE with arbitrary conditioning (VAEAC). This formulation allows missing data generation to be conditioned on any combination of observed ones. However, the presence of complete data is strictly required during training. Other works modified VAE formulation to model the likelihood of the observed data under missing at random (MAR) assumption. All observed parts (denoting each part as a variable) of any input data point are jointly embedded into a holistic shared latent space. However, with heterogeneous data, this procedure adds unavoidable noise to the latent space as the distribution of one input variable can be far from the other input variables. To alleviate this problem, the proposed VSAE of various embodiments herein includes a novel per-variable selective proposal distributions where the latent variables for observed data only rely on the corresponding input variable.

Further, the proposed method and mechanism models the joint distribution of observed and unobserved variables along with the imputation mask (a.k.a. missingness pattern), enabling the model to perform both data generation and imputation under relaxed assumptions on the missingness mechanism.

Proposed Machine Learning Architecture

Described in various embodiments herein, systems, methods, processes, devices, and computer readable media are provided in relation to addressing the technical problem of learning efficiently from partially-observed heterogeneous, or multi-modal, data for data imputation. The partial observation is defined as an inter-modality mechanism whereby the imputation is for the whole modality. The framework is evaluated on both low-dimensional tabular data and high-dimensional multi-modal datasets, and in some embodiments, variant structures may be used that are adapted to each type of specific data set.

The proposed model is capable of capturing latent dependencies within heterogeneous data by performing integration in the latent space. At the same time, the proposed model deals with missing data by completing the representation in the latent space using a selective interference network. The proposed model is also configured to learns the join distribution of data and imputation mask without strong assumptions such as MCAR. As a result, the trained model can be deployed for later use in both data generation and imputation. In particular, once trained, the model can impute missing data from any combination of observed variables while being trained efficiently with a single variational objective.

Let the observed and unobserved attributes as $x_O$ and $x_U$, Applicants model the joint data distribution of the form $x_o$, $x_u$, $m \sim p_\lambda(x_o, x_u, m)$, which could be alternatively written as $p(x_U; x_O)$ (instead of conditional $p(x_U|x_O)$ as in most previous works). Usually the latter approach inevitably requires the unobserved entries during training. In particular, in some embodiments, a computer implemented system for conducting machine learning using partially-observed heterogeneous or multimodal data is provided.

FIG. 1 is a block schematic diagram of a systems architecture of a system 100, according to some embodiments. The proposed system 100 is directed to an improvement on approaches in three fields. The first one consists of state-of-the-art data imputation mechanisms. The second group is composed by generative models based in neural networks, and in particular, networks focusing on generating tabular data and handling issues related to categorical variables, rather than generating one high-dimensional image or text variable. Lastly, the third group is constituted by methodologies using deep generative models for data imputation.

In FIG. 1, attributes are denoted by different labels $x_1$, $x_2$ are unobserved; $x_3$ is observed. The attributive proposal network (e.g., a local proposal network) and collective proposal network (e.g., a global proposal network) are employed by selection, with selected variables indicated by the arrows. The output of mask generative network is provided to each decoder of data generative network as extra condition. Standard normal prior is not plotted for simplicity. All components can, in some embodiments, be trained simultaneously in an end-to-end manner.

System 100 can be provided, for example, in the form of a server computer coupled to a data center, such as a rack mounted computing appliance that is coupled to other devices on a network. In other embodiments, system 100 can be a circuit or a computing module that is provided on another computing device or circuit board. The system 100 can include a processor operating in conjunction with computer memory, the system including a data receiver adapted to receive one or more partially observed (e.g., heterogeneous or multimodal data sets representative of the partially-observed heterogeneous or multimodal data), each having a subset of observed data and a subset of unobserved data, the data receiver configured to extract a mask data structure from each data set of the one or more data sets representative of which modalities are observed and which modalities are unobserved.

The system includes a machine learning data architecture engine adapted to maintain an attributive proposal network for processing the one or more heterogeneous or multimodal data sets and to maintain a collective proposal network for processing the corresponding mask data structure.

System 100 is adapted to maintain various data model architectures, which can be represented in the form of attributive proposal network 106, collective proposal network 108, data generative network 110, and mask generative network 116. These networks, for example, can be neural network representations stored as interconnected data objects in a data storage as interconnected representations which are updated during the training process. A first data generative network is maintained including a first set of one or more decoders, each decoder of the first set of the one or more decoders configured to generate output estimated data proposed by the attributive proposal network 106 and the collective proposal network wherein 108, for the unobserved modalities, expectation over global observation from the collective proposal network is applied as a corresponding proposal distribution.

In an aspect, the attributive proposal network 106, the collective proposal network 108, the mask generative network 116, and the data generative network 110 are trained together jointly. As described in further detail, these networks operate in concert to provide a mechanism that can be utilized for imputing "missing" labels or tracking a mask data structure (e.g., where the missingness/pollution distribution of the input data is not known a priori).

Input data 102 is received by an attributive proposal network 106, and the input data 102 is typically only partially-observed. Input data 102, as shown in this example, is multi-modal data, with each modality shown as a different circle having a different shading, $x_1$ and $x_2$ being unobserved, and $x_3$ being observed. This is a highly simplified example and there can be other, more, different modalities. In more complex implementations, there are a very large number of modalities. There can be one or more modalities.

As described herein input data 102 can also be heterogeneous data, received from a number of different sources (e.g., noisy data). The input data 102 can be obtained in the form of various data structures or data streams. For example, data streams can be provided through message packets arriving on a coupled message bus connected to a network. As noted above, the input data 102 can be incomplete, unreliable, or polluted. The data is split between observed and unobserved data to reflect the "completeness" of the input data 102.

The system 100 can be implemented, for example, as a computer server operating at a data center that receives multi-modal data sets and outputs, in a first embodiment, estimated values for the unobserved portions of the multi-modal data sets (e.g., filling in the blanks), or, in a second embodiment, generates entirely new heterogeneous or multimodal data sets that are represented in a similar distribution as the original input data 102 (e.g., making simulated customer data for customers that do not exist in reality). In a third embodiment, the simulated customer data is also generated alongside a simulated set of masks that can be used to generate partially observed simulated customer data. For example, data sets can be received in the form of arrays, vectors, comma separated values, incomplete databases, etc. In some embodiments, the complete data can have additional rows or columns indicating additional metadata as to a confidence score or a flag indicating that certain data is imputed.

Accordingly, a mask 104 can be generated from the input data 102, or in some embodiments, received along with the input data 102. The mask 104, for example, can be a variable such as a Boolean indicating whether something is observed or not. In a variant embodiment, the mask 104 is not a Boolean but a probability distribution indicative of a confidence level associated with a particular observation. The mask 104 can be a data structure, such as an array, a linked list, among others.

In an illustrative, non-limiting example, the input data 102 could include a set of partially observed data representative of a person's financial history. The observed data can include known information (e.g., bank accounts, investments held with a particular institution), and the unobserved data can include information that the particular institution does not have access to, such as accounts held at other institutions, other assets, or other information about the person. In this example, the mask 104 could be a vector or an array of Booleans indicative of whether each modality is observed or not observed.

The attributive proposal network 106, the collective proposal network 108, the data generative network 110, and the mask generative network 116 are machine learning data architectures which, for example, can include computing devices configured to maintain neural networks that are trained for optimization across a number of training iterations (e.g., epochs).

Each of these machine learning data architectures are trained across the population level of users. In some embodiments, different demographic groups can be segmented for training, and in other embodiments, training can be similar regardless of percentage and variety of distribution (e.g., people with the same income level, same postal code, could have different credit products).

Figure 2:
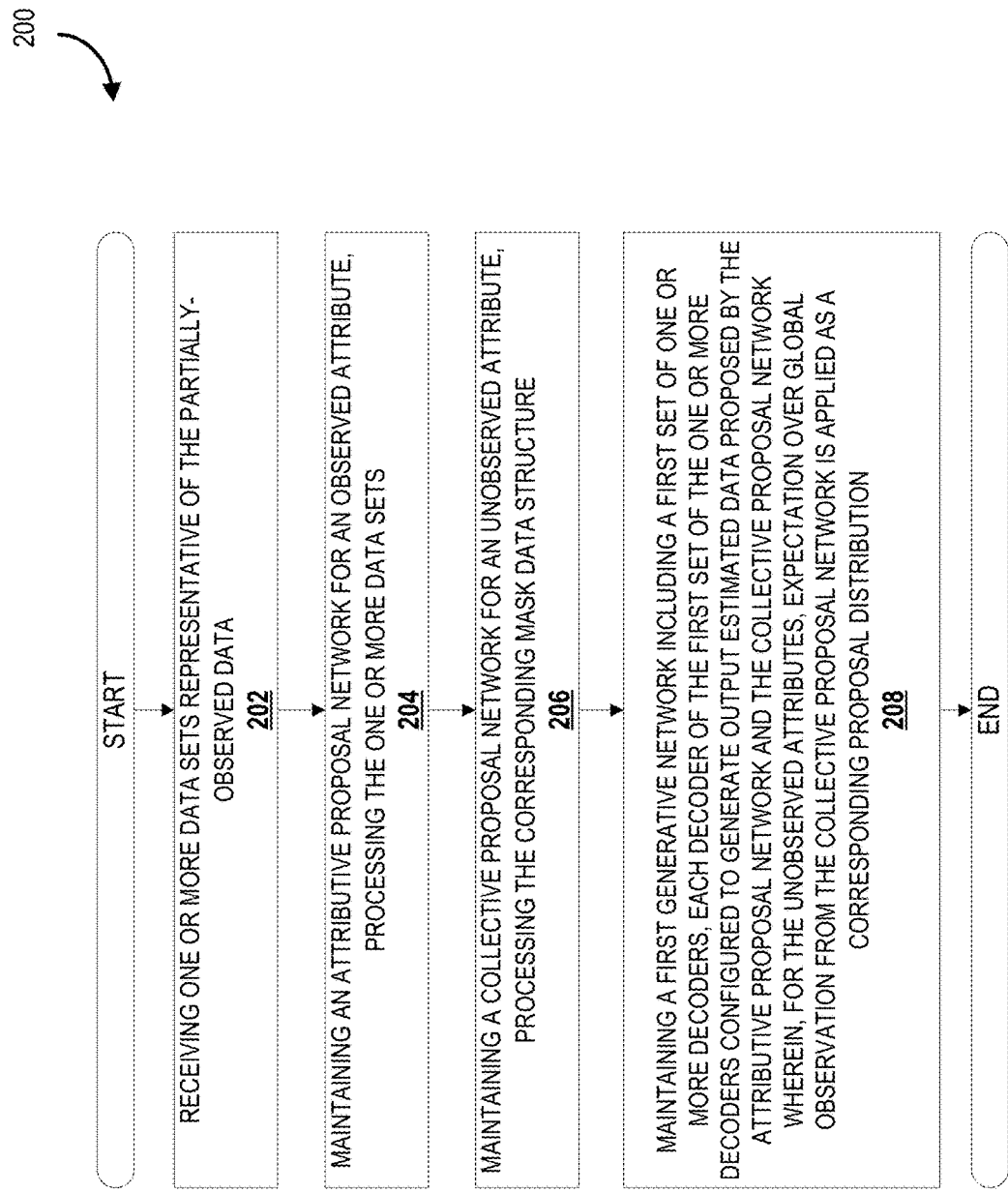
FIG. 2 is a process diagram of a method for conducting machine learning using partially-observed heterogeneous data, according to some embodiments.

As shown in the example method 200 in FIG. 2 in steps 202, 204, 206, and 208, the attributive proposal network 106 is adapted for processing the one or more heterogeneous data sets, for an observed attribute, and the collective proposal network 108 is configured for an unobserved attribute and processing the corresponding mask data structure 104. The attributive proposal network 106, for observed attributes are adapted to model that attribute by itself.

The collective proposal network 108 is used when the system 100 does not observe that particular attribute.

The collective proposal network 108 uses other information that is available, such as the mask, the other attributes, etc. to obtain a holistic view. In some embodiments, the proposal distribution is not restricted as one encoder which takes the data as input. Instead, the model can select a proper proposal distribution as the approximation of the true posterior based on the mask. In an embodiment, the model is jointly trained following stochastic gradient variational Bayes.

Variational Autoencoder

VAE is a probabilistic generative model, composed by an inference network and a generation network. It assumes an approximate posterior for the latent space, and trained until ideally the decoded reconstructions from approximate posterior match the data likelihood.

Latent variable models attempt to model p(x, z) over observations of x. However, the marginal likelihood $p(x) = \int p(x|z)p(z)dz$ is computationally intractable. By introducing a parametric proposal distribution $q_\phi(z|x)$, a common strategy to alleviate the issue is to maximize an evidence lower bound (ELBO) of p(x):

$$\mathcal{L}_{\theta,\phi}(x) = \mathbb{E}_{z \sim q_\phi(z|x)}[\log p_\theta(x|z)] - \underbrace{D_{KL}[q_\phi(z|x) \| p(z)]}_{KLRegularizer} \quad (1)$$
$$\underbrace{\qquad\qquad\qquad\qquad}_{ConditionalLog-Likelihood}$$

It is also equivalent to minimizing the KL divergence between approximate posterior $q_\phi(z|x)$ and true posterior $p_\theta(z|x)$. Variational autoencoder (VAE) realizes inference network (encoder) $q_\phi(z|x)$ and generative network (decoder) $p_\theta(z|x)$ with deep neural networks, and uses a standard Gaussian as the prior p(z). Thus, $\mathcal{L}_{\theta,\phi}(x)$ is optimized over all training data w.r.t the parameters $\{\theta, \phi\}$ using backpropagation with reparameterization.

Explained alternatively, in the generation module, $p_\theta(\tilde{x}|z)$ a decoder, realized by a deep neural network, maps a latent variable z to the reconstruction $\tilde{x}$ of observation x.

In the inference module, an encoder produces the sufficient statistics of variational approximation of posterior $q_\phi(z|x)$ a known density family where sampling can be readily done. In vanilla VAE setting, by simplifying approximate posterior as diagonal normal distribution and prior as standard diagonal normal distribution, the training criterion is to maximize the ELBO by jointly optimizing $\theta$ and $\phi$.

$$\log p_\theta(x) \geq \mathcal{L}_{\theta,\phi}(x) = \mathbb{E}_{q_\phi(z|x)}[\log p_\theta(x|z)] - D_{KL}[q_\phi(z|x) \| q_\psi(z)]$$

where DKL denotes the Kullback-Leibler (KL) divergence.

Usually the prior $q_\psi(z)$ and the approximate $q_\phi(z|x)$ are chosen to be in simple parametric form, such as a Gaussian distribution with diagonal covariance, which allows for an analytic calculation of the KL divergence.

While VAE approximates p(x), conditional VAE approximates the conditional distribution p(x|y).

By simply introducing a conditional input, CVAE is trained by maximizing the ELBO.

Data Imputation

Missing values usually exist in realistic datasets and data imputation is a process to replace/generate those missing values based on other available but partially-observed information. Many standard machine learning techniques require fully-observed data.

With imputed complete data, those techniques can be used. Also, the missing information itself sometimes is valuable and we want the model to generate those missing entries. The imputation process is to learn a generative distribution for unobserved missing data.

The generative process of incomplete data can be modeled by the joint distribution of the data and the imputation mask, parameterized by $$x_o, x_u, m \sim p_\lambda(x_o, x_u, m), \quad (2)$$

which can be learned in a marginalized maximum likelihood setting:

$$\max_\lambda \int p_\lambda(x_o, x_u, m) dx_u = \max_\lambda p_\lambda(x_o, m). \quad (3)$$

Little & Rubin categorize the missingness mechanism into three types based on the dependency relationships between the data $x = [x_o, x_u]$ and the mask m as follows, Missing Completely At Random (MCAR). Missingness is completely independent of data, $$p(x_o, x_u, m) = p(x_o, x_u) p(m) \quad (4)$$

Missing At Random (MAR). Missingness depends only on observed variables, $$p(x_o, x_u, m) = p(x_o, x_u) p(m|x_o) \quad (5)$$

Not Missing At Random (NMAR). Missingness depends on unobserved variables or both observed and unobserved variables.

Most previous work on learning from partially-observed data follow MCAR or MAR assumption since the factorization in Eq. (4) and Eq. (5) decouples the mask m from $x_u$ in the integration of the likelihood function (Eq. (3)) and therefore provides a simple but limited solution to this problem. The approach herein in some embodiments aims to relax these assumptions and model the joint distribution of data and mask.

In alternative forms, this could be described in the following manner.

Let $x \in R^D$ be the complete data vector and $m \in \{0, 1\}^D$ be the binary mask vector that determines which dimensions in the data are observed:

$$x \sim p_{complete}(x), m \sim p(m|x), x_O = \{x_i | m_i = 0\}, x_U = \{x_i | m_i = 1\}$$

In the standard maximum likelihood setting, the unknown parameters are estimated by maximizing the following marginal likelihood, integrating over the unknown missing data values:

$$p(x_O, m) = \int p(x_O, x_U) p(m|x_O, x_U) dx_U$$

The missing data mechanism $p(m|x_O, x_U)$ can be characterized in terms of independence relations between the complete data $x = x_O \cup x_U$ and the masks m:

Missing completely at random (MCAR) $p(m|x_O, x_U) = p(m)$,|

Missing at random (MAR): $p(m|x_O, x_U) = p(m|x_O)$,

Not missing at random (NMAR): $p(m|x_O, x_U) = p(m|x_U)$ or $p(m|x_O, x_U)$.

Most work on incomplete data assumes MCAR or MAR since under these assumptions $p(x_O, m)$ can be factorized into $p(x_O)p(m|x_O)$ or $p(x_O)p(m)$. With such decoupling, one does not need missing information to marginalize the likelihood and it provides a framework to learn from partially-observed data.

Proposed Approach

A novel VAE-based framework named Variational Selective Autoencoder (VSAE) to learn from partially-observed heterogeneous or multi-modal data is described, and shown in an example implementation, in the architecture of FIG. 1 at system 100. First the problem is formalized, followed by a detailed description of the model data architecture of some embodiments is provided.

Problem Statement

Any heterogeneous data point is represented as a set of random variables $x=[x_1, x_2 \ldots, x_M]$ representing different attributes collected from multiple sources. The type and size of each attribute $x_i$ vary. For example, it can be either high-dimensional (e.g., multimedia data) or low-dimensional (e.g., tabular data). These are shown as input data 102.

An M-dimensional binary mask variable $m \in \{0, 1\}^M$ is denoted to represent the missingness: for the i-th attribute, $m_i=1$ if it is observed and 0 otherwise. The binary mask variable can be stored, for example, as a data structure. The data structure can include other data types aside from binary/Booleans, as those are shown as examples.

One can induce observed attributes by the set $\mathbb{O} =\{i|m_i=1\}$ and unobserved attributes by the complementary set $\mathbb{U} =\{i|m_i=0\}$. Accordingly, the collective representation of the observed attribute is denoted with $x_o=[x_i|m_i=1]$, and unobserved attributes with $x_u=[x_i|m_i=0]$, where O and U are subsets of modalities that $x=x_O \cup x_u$.

The goal of system 100 is to learn the joint distribution of all attributes and mask together from incomplete training data.

In some embodiments, the mask m can be always fully-observed because the system knows which modalities in each data example are missing. It is assumed the mask distribution follows MCAR missing mechanism that $m \sim p(m)$. However, not all embodiments have this assumption, as noted below, variant embodiments describe a NMCAR missing variation.

The partial missing information is defined on the missingness of the attribute. An approach imputes the missing attributes given the information from observed modalities.

Proposed Variational Selective Autoencoder, Mathematical and Model Description

Under partially-observed heterogeneous setting, an objective is to model the joint distribution $p(x, m)=\int p(x, m|z)p(z)dz$ with z representing latent variables, and $x=[x_o, x_u]$ denote the collective representation of all attributes.

As illustrated in FIG. 1, for example, VSAE handles partially-observed heterogeneous data by learning individual encoders for observed attributes and a collective encoder for unobserved ones. The latent codes representing each attribute are then aggregated and fed to the decoders to reconstruct the mask and all attributes independently.

Following VAE formulation, a proposal distribution $q(z|x, m)$ is constructed to approximate the intractable true posterior. Withe the inclusion of the novel selective proposal distribution, the parameters of inference networks are expanded to $\{\phi, \psi\}$, where $\phi$ represents encoder parameter for observed attributes, and $\psi$ for unobserved attributes.

Following the same fashion, the parameters of generative networks are expanded to $\{\theta, \epsilon\}$, with $\theta$ denoting decoder parameter for data, and $\epsilon$ for mask. The variational evidence lower bound of log p(x, m) can thus be derived as $$\mathcal{L}_{\phi,\psi,\theta,\epsilon}(x, m) = \mathbb{E}_{z \sim q_{\phi,\psi}(z|x,m)}[\log p_{\theta,\epsilon}(x, m|z)] - \underbrace{D_{KL}[q_{\phi,\psi}(z|x, m)||p(z)]}_{KLRegularizer}, \quad (6)$$
$$\underbrace{\phantom{\mathbb{E}_{z \sim q_{\phi,\psi}(z|x,m)}[\log p_{\theta,\epsilon}(x, m|z)]}}_{ConditionalLog-Likelihood}$$

where the KL divergence $D_{KL}[q_{\phi,\psi}(z|x, m)||p(z)]= \mathbb{E} z \sim q_{\phi,\psi}(z|x,m)[\log q_{\phi,\psi}(z|x, m) - \log p(z)]$ acts as a regularizer to push proposal distribution $q_{\phi,\psi}(z|x, m)$ close to prior $p(z)$.

Factorized Latent Space: The approach assumes that the latent space can be factorized w.r.t the attributes $z=[z_1, z_2, \ldots, z_M]$, $$p(z)=\Pi_{i=1}^{M} p(z_i), \quad q(z|x,m)=\Pi_{i=1}^{M} q(z_i|x, m) \quad (7)$$

All priors $p(z_i)$ can be standard Gaussians and proposal distributions $q(z_i|x, m)$ are diagonal Gaussians with means and covariances inferred by neural networks. This factorization separates encoding of each attribute and yields an efficient distribution for the latent space by assuming the latent variables are conditionally independent given the data and mask. Hence, it provides a mechanism to decouple the latent variables while integrating the heterogeneous data efficiently in the latent space.

Selective Proposal Distribution: The standard proposal distribution of VAE is inferred from the fully-observed data and is not applicable for partially-observed input. To circumvent this, following the factorization assumption above, a selective proposal distribution is introduced for each latent variable:

$$q_{\phi,\psi}(z_i | x, m) = \begin{cases} q_\phi(z_i | x_i) & \text{if } m_i = 1 \\ q_\psi(z_i | x_o, m) & \text{if } m_i = 0 \end{cases} \quad (8)$$

This conditional selection of proposal distribution is determined by the mask variable. Accordingly, the inference network is subdivided into two types of networks, Attributive Proposal Network 106: For an observed attribute, $q_\phi(z_i|x_i)$ is selected, which is inferred merely from the individual observed attribute. This formulation aids the VAE encoders by explicitly focusing on the relevant inputs and refusing the noisy or useless information.

Collective Proposal Network 108: Differently, for an unobserved attribute, the proposal distribution is selected as $q_\psi(z_i|x_o, m)$, which collects all observed ones and the mask to produce the proposal distribution.

Latent Variable Aggregation: The latent variables for all attributes are sampled using the selective proposal distributions in (8). Next, to capture the intricate dependency relationships between observed and unobserved attributes, the variational latent varibales are aggregated with an aggregator $\mathcal{F}(\cdot)$ before providing to the decoders that $p_\epsilon(m|z)=p_\epsilon(m|\mathcal{F}(z))$ and $p_\theta(x_i|z, m)=p_\theta(x_i|\mathcal{F}(z), m))$.

Applicants use concatenation as $\mathcal{F}(\cdot)$ in our experiments, although it can be any aggregation function in general. The conventional VAEs, however, often fuse the attributes naively in the raw data space with a single encoder. Consequently, the heterogeneity and partially-observed nature in the data space will restrain those models from learning informative representations.

Data & Mask Generative Networks. Using Bayes rule, the conditional log-likelihood in $\log p_{\theta,\epsilon}(x, m|z)$ Eq. (6) can be factorized into two terms: mask conditional log-likelihood $\log p_\epsilon(m|z)$ and data conditional log-likelihood $\log p_\theta(x|m, z)$. Both mask and data are reconstructed from shared aggregated latent variables through mask generative network and data generative network shown in FIG. 1.

Further, the data conditional log-likelihood factorizes over the attributes assuming the reconstructions are conditionally independent given the mask and the latent variables of all attributes:

$$\log p_\theta(x \mid m, z) = \underbrace{\Sigma_{i \in O} \log p_\theta(x_i \mid m, z)}_{Observed} + \underbrace{\Sigma_{j \in U} \log p_\theta(x_j \mid m, z)}_{Unobserved} \quad (9)$$

Mask Variational Autoencoder (Mask VAE)

By sharing a latent space with Data VAE, the system can be configured to select a proper proposal distribution according to the missingness. Mask VAE consists of an encoder which encodes the mask vector to stochastic latent variables and a decoder which decodes the latent variables to a reconstruction of the mask.

The encoder, an MLP parameterize by $\psi$, produces a global proposal distribution. The corresponding dimensions of the missing modalities are employed for the imputation. The decoder, an MLP parameterized by $\epsilon$, maps the aggregated latent code to a reconstruction of the binary mask vector assuming each output dimension is independent Bernoulli distribution. The mask can be fully-observed and available during training and testing stages. The proposal distribution conditioned on the mask can be informed by the mask shape and aware of the missingness. The mask distribution is explicitly modeled and it can be sampled from p(m). This is helpful if the data is polluted and the "missingness" is still observed but noisy. An approach can replace these entries if the system can learn a mask distribution to denote where the entry is from the original data.

Objective Function. The ELBO in Eq. (6) should be maximized over training data. But, $x_u$ is unavailable during training. Therefore, the final objective is defined by taking expectation over $x_u$:

$$\mathcal{L}'_{\phi,\psi,\theta,\epsilon}(x_o,m) = \mathbb{E}_{x_u}[\mathcal{L}_{\phi,\psi,\theta,\epsilon}(x_o,x_u,m)] \quad (10)$$

One can plug Eq. (6) to (9) as well as the expanded $D_{KL}$ into Eq. ((10)). Since only the unobserved attributes conditional log-likelihood depends on $x_u$, one obtains:

$$\mathcal{L}'_{\phi,\psi,\theta,\epsilon}(x_o, m) = \underbrace{\mathbb{E}_z[\log p_\epsilon(m \mid z)]}_{MaskCond.LL} + \underbrace{\mathbb{E}_z[\Sigma_{i \in O} \log p_\theta(x_i \mid m, z)]}_{ObservedattributesCond.LL} + \quad (11)$$

$$\underbrace{\mathbb{E}_z[\Sigma_{j \in U}\mathbb{E}_{x_j}[\log p_\theta(x_j \mid m, z)]]}_{UnobservedattributesCond.LL} - \underbrace{\sum_{k=1}^{M} \mathbb{E}_{z_i}[\log q_{\phi,\psi}(z_i \mid x, m) - \log p(z_i)]}_{KLRegularizer}$$

where $z_i \sim q_{\phi,\psi}(z_i|x, m)$ is given by Eq. ((8)).

Training Approach. In Eq. ((11)), direct calculation of unobserved attributes conditional log-likelihood is unrealizable, considering only observed attributes are accessible during training. Instead, the system 100 can generate "accessible" unobserved attribute $x_j$ from the distribution estimated by:

$$\hat{p}(x_j) = \iint p(z) p_{\epsilon_{old}}(m|z) p_{\theta_{old}}(x_j|m,z) dm dz \quad (12)$$

where $p_{\epsilon_{old}}(m|z)$ and $p_{\theta_{old}}(x_j|m, z)$ are generative networks with parameters learned up to the current iteration, allowing synthesis of unobserved attributes by decoding samples drawn from prior p(z).

Therefore, one is able to further approximate the term $\mathbb{E} x_j[\log p_\theta(x_j|m, z)]$ with $\mathbb{E} x_j \sim \hat{p}(x_j)[\log p_\theta(x_j|m, z)]$. Empirically, given a partially-observed mini-batch, the system 100 can use a two-stage training scheme: in the first stage, unobserved attributes are generated by decoding z sampled from the prior.

The decoders used are the ones which have been learned so far in order to get accessible unobserved attributes.

In the second stage, the system 100 is configured to re-input the same batch to determine all observed terms and approximate the unobserved term with the accessible unobserved attributes.

Experiments show that this training approach gives an effective approximation to the full expectation. In fact, given observed attributes and mask variable, the prior network can perform as a self-supervision mechanism to encourage the model to find the most likely unobserved attributes of this sample for taking the expectation.

Alternative Training Criterion

Alternative training criterion explained as follows: The encoders and decoders of Data VAE are parameterized by $\phi$ and $\theta$. The encoder and decoder of Mask VAE are parameterized by $\psi$ and $\epsilon$. With reparameterization, one can jointly optimize respect to $\phi$, $\theta$, $\psi$, $\epsilon$:

$$\max_{\phi,\theta,\psi,\epsilon} \mathbb{E}_m \mathbb{E}_{x_O}[\mathcal{L}'_{\phi,\theta,\psi,\epsilon}(x_O, m)]$$

Since the above equation only requires mask and observed modalities, this modified ELBO $\mathcal{L}'_{\phi,\theta,\psi,\epsilon}$ can be optimized without the presence of missing information.

The system can draw samples from the selected proposal distributions to determine the aggregated latent code. The KL-divergence term is determined analytically for each factorized term. The likelihood term of data is only for observed modality. For different data types, the system, in some embodiments, can use different distribution for the output of the data decoders.

Binary Cross-Entropy can be used to determine reconstruction loss for Bernoulli generative distribution and MSE for Gaussian generative distribution. The likelihood term of mask is always calculated for the whole mask since it is fully-observed. The output of Mask VAE decoder is Bernoulli distribution and Applicants used BCE loss for the reconstruction loss. In this alternative model, the whole model is trained jointly using reparameterization with Adam optimizer of learning rate as 0:003.

Model Applications

In the proposed model, p(x, m, z) is learned by approximating the posterior with the probabilistic encoders, which we further separate as attributive proposal network and collective proposal network. Unlike conventional data imputation models, the system 100 provides a unified framework that can be utilized for a combination of data imputation, data generation and mask generation, among others.

Data Imputation: The aim is to impute the missing data given the observed data, thus it can be viewed as conditional generation of unobserved attribute. This can be performed by sampling the latent codes for all attributes using $q_{\phi,\psi}(z_i|x, m)$ in Eq. ((8)). Next, the aggregated latent codes and mask are given to the decoders of unobserved attributes for generation.

This process can be also mathematically described as:

$$p(x_u|x_o,m) \approx \int p_\theta(x_u|m,z) q_{\phi,\psi}(z|x_o,m) dz \quad (13)$$

Data & Mask Generation: Given random samples from standard Gaussian prior p(z), the system 100 can generate a mask using the mask generative network. Next, the sampled latent codes and the generated mask can be given to the data generative network to sample the attributes. In fact, modeling mask distribution in the framework not only help to inform the data generation of the relevant missing mechanism but also realizes sampling from mask distribution itself.

Mask generation may have applications such as incomplete data synthesis or obtaining the potential mask if the exact mask is not available (e.g., when data is polluted rather than missing).

Network/Module Details/Implementation Variations

Each module of the model data architecture can be implemented using neural networks and optimizing the parameters via backpropagation techniques, according to some embodiments.

The model data architecture is composed of multiple encoders and decoders with aggregators. The architecture is shown in FIG. 1 with different modalities in the input data 102 denoted by different colors/shading (each circle correlates to a different modality).

The whole architecture can be viewed as two different types of auto-encoding structure, the top branch data-wise encoders/decoders 106 and 110, and the bottom branch mask-wise encoder/decoders 108 and 116.

The model data architecture can have a single shared latent space with predefined standard Gaussian prior. Here, Applicants refer to the data-wise auto-encoding structure as Data VAE and the mask-wise auto-encoding structure as Mask VAE.

Experiments

Applicants evaluate the model on both low-dimensional tabular data and high-dimensional multi-modal data under various missing mechanisms. In tabular datasets, heterogeneous data consists of numerical and categorical attributes. In multi-modal datasets, the input variables are high-dimensional representations of image, text, or audio from different distributions. Experiments on both data imputation, data and mask generation are conducted and VSAE of system 100 is compared with state-of-the-art models.

Experiment—Tabular Data

Tabular data are ordered arrangement of rows and columns. Each row is a data sample with multiple attributes (typically low-dimensional), while each column represents a single attribute collected heterogeneously. Due to communication loss or privacy issue, those data samples commonly consist of partial observations on the attributes.

For this, Applicants choose UCI repository which contains various tabular datasets of numerical or categorical attributes. In all experiments, min-max normalization is applied to pre-process the numerical data and the unobserved dimensions are replaced by standard normal noise.

Applicants split training and test set with size ratio 4:1 and use 20% of training data as validation set to choose the best model. Mean-squared error, cross-entropy and binary cross-entropy are used as reconstruction loss for numerical, categorical and mask variables, respectively.

MCAR Data Imputation on UCI datasets: Applicants consider three types—categorical, numerical and mixed tabular datasets. Missing ratio is 0.5 on all datasets. Categorical and numerical attributes are evaluated by PFC and NRMSE respectively, lower is better for both.

Applicants show mean and standard deviation over 3 independent runs. $\Delta<0.005$.

TABLE 1

MCAR Data Imputation on UCI datasets. We consider three types-categorical, numerical and mixed tabular datasets. Missing ratio is 0.5 on all datasets. Categorical and numerical attributes are evaluated by PFC and NRMSE respectively, lower is better for both. We show mean and standard deviation over 3 independent runs. $\Delta < 0.005$.

| Attribute type | Phishing categorical | Mushroom categorical | Yeast numerical | Whitewine numerical | Heart (mixed) categorical | Heart (mixed) numerical |
|---|---|---|---|---|---|---|
| AE | 0.348 ± Δ | 0.556 ± 0.009 | 0.737 ± 0.035 | 0.3772 ± Δ | 0.550 ± 0.037 | 0.575 ± 0.008 |
| VAE | 0.274 ± Δ | 0.470 ± 0.016 | 0.461 ± Δ | 0.3714 ± Δ | 0.577 ± 0.019 | 0.588 ± 0.017 |
| CVAE w/mask | 0.241 ± Δ | 0.445 ± Δ | 0.445 ± Δ | 0.3716 ± Δ | 0.552 ± Δ | 0.565 ± 0.009 |
| MVAE | 0.308 ± 0.016 | 0.586 ± 0.017 | 0.442 ± 0.016 | 0.3722 ± Δ | 0.541 ± 0.055 | 0.565 ± Δ |
| HI-VAE | 0.238 ± Δ | 0.570 ± Δ | 0.464 ± Δ | 0.3719 ± Δ | 0.538 ± 0.008 | 0.569 ± 0.035 |
| VSAE (ours) | 0.237 ± Δ | 0.396 ± 0.009 | 0.409 ± 0.008 | 0.3711 ± Δ | 0.530 ± 0.016 | 0.558 ± 0.007 |

Experiment—Data Imputation on UCI Datasets

Applicants first consider data imputation experiment—imputing unobserved attributes given observed attributes and mask. The system 100 can be used to provide VSAE in this case as in Eq. ((13)).

Applicants report the measurements: NRMSE (i.e., RMSE normalized by the standard deviation of the ground truth feature and averaged over all features) for numerical datasets and PFC (i.e., proportion of falsely classified attributes of each feature and averaged over all features) for categorical datasets.

Applicants evaluate the model under various missing mechanisms by synthesizing mask following different rules.

MCAR masking: This implies data is independent on mask. Applicants randomly sample from independent Bernoulli distributions on each attribute with missing ratios 0.3, 0.5, 0.7 to simulate MCAR missing mechanism.

Applicants compare the performance of VSAE with deterministic autoencoder (AE), variational autoencoder (VAE), mask-conditioned VAE (CVAE) and multimodal variational autoencoder (MVAE) and heterogeneous incomplete VAE (HI-VAE). To establish fair comparison, all models in the experiments are implemented with the same backbone structure.

Table 1, above, shows that VSAE of system 100 outperforms other methods on both numerical and categorical data in the setting of 0.5 missing ratio. VSAE can achieve lower imputation error with lower variance compared to other methods.

Figure 4:
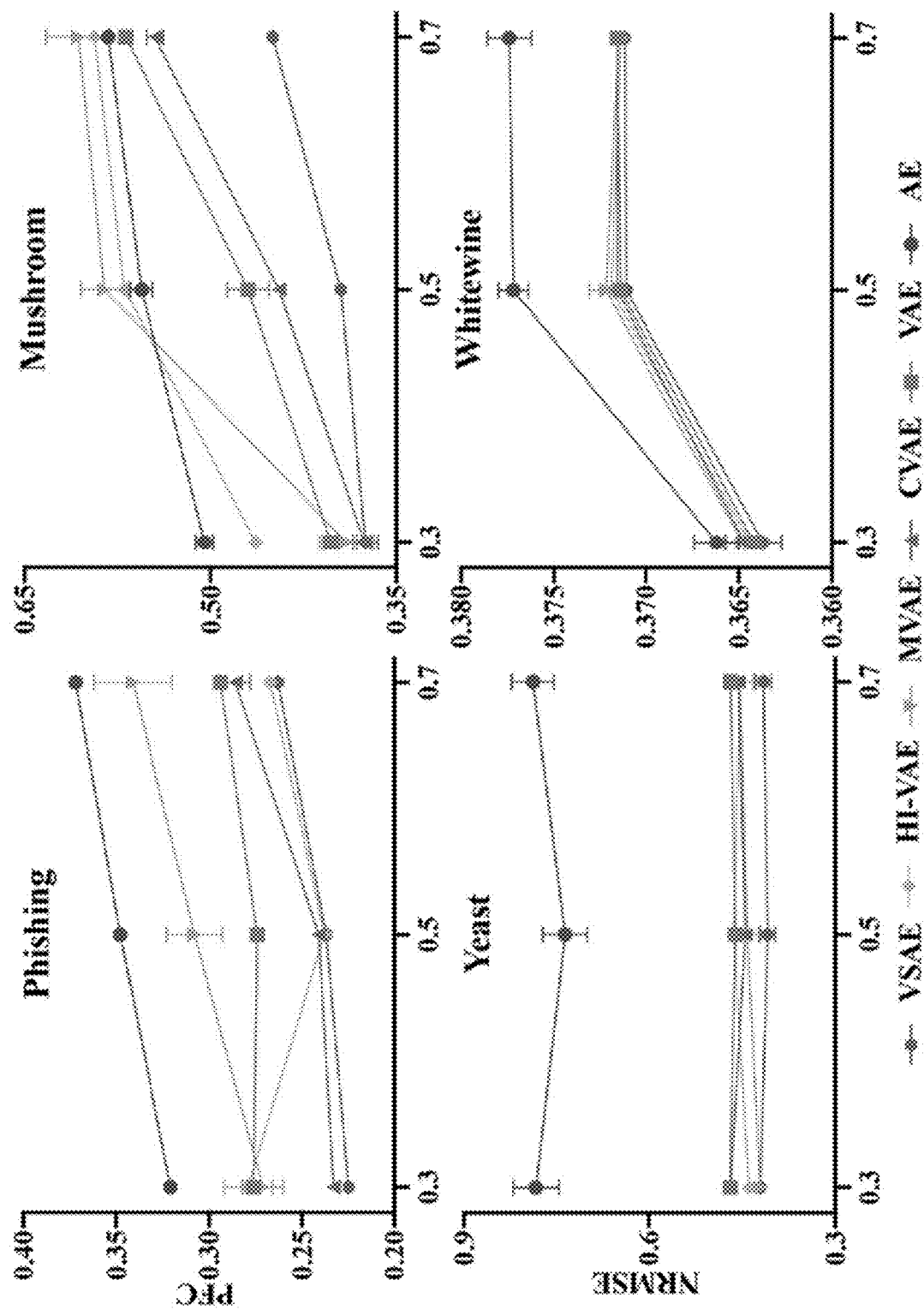
FIG. 4 is four graphs which show the models error relative to variance for missing ratios.

FIG. 4 illustrates that the model generally has lower error with lower variance for all missing ratios. When the missing ratio increases (i.e. more data become unobserved), VSAE from system 100 is able to maintain stable imputation performance on most of the datasets. Conversely, Applicants observe a performance drop along with higher variance in the case of baselines.

Applicants believe the selection of proposal distribution in the system 100 mitigates this negative effect introduced by more unobserved attributes. As the missing ratio increases, the input to attributive proposal network keeps same, while the proposal networks of other VAE-based methods have no choice but to learn to focus on the valuable information in data space.

Non-MCAR masking. System 100 (VSAE) jointly models data and mask distribution without any assumption on mask distribution, in some embodiments. MIWAE conducted experiments with synthesized mask in a non-MCAR manner. Applicants follow them to mimic MAR/NMAR missing mechanism on UCI numerical datasets by defined missing rules, and compare to MIWAE on non-MCAR data imputation task:

Missing At Random (MAR): The mask distribution solely depends on the observed attributes. Applicants choose 25% attributes as default observed data ($m_i=1$), then sample the mask of remaining attributes from probability $$\pi(m) = \text{sigmoid}\left(\frac{1}{M}\sum_{k=1}^{K} x_k\right),$$

where M is the number of the attributes and K is the number of default observed attributes.

Not Missing At Random (NMAR): The mask distribution depends on observed and unobserved attributes. Applicants sample the mask from the probability $\pi(m_i)=\text{sigmoid}(x_i)$, where $m_i$ is i-th element of mask m, $x_i$ is the i-th attribute.

The system 100 models the joint distribution of attributes and mask without presumably false introduction of independence among attributes and mask.

Table 2 indicates the model can outperform state-of-the-art non-MCAR model MIWAE in the non-MCAR missing setting.

TABLE 2

Non-MCAR Data Imputation. Missing mechanism is defined as above. We show mean and standard deviation of NRMSE over 3 independent runs, lower is better. $\Delta < 0.01$.

| | Method | MAR | NMAR |
|---|---|---|---|
| Yeast | MIWAE | 0.493 ± 0.025 | 0.513 ± 0.036 |
| | VSAE (ours) | 0.472 ± 0.016 | 0.456 ± $\Delta$ |
| Whitewine | MIWAE | 0.493 ± $\Delta$ | 0.463 ± $\Delta$ |
| | VSAE (ours) | 0.382 ± $\Delta$ | 0.373 ± $\Delta$ |

Experiment—Mask Generation

VSAE enables us to generate data and mask from learned generative model $p_{\theta, \epsilon}(x, m, z)$. Applicants show mask generation results on UCI and data generation on multi-modal datasets, since the sole data generation is not qualitatively or quantitatively measurable in the case of UCI datasets.

The mask conditional log-likelihood term allows the latent space to be embedded with information from mask variable and therefore reconstruct (or generate, if sampling from the prior) the mask variable.

In the setting of MCAR, the mask distribution follows Bernoulli distribution governed by the predefined missing ratio. After training, Applicants can sample from the prior to decode the mask.

Applicants evaluated mask generation by the average proportion of missing attributes on generated masks (a.k.a. $m_i=0$), which is determined on 100 sampled mask variables, then averaged over all experiments.

Applicants obtained 0.312±0.016, 0.496±0.009, 0.692±0.005 for the pre-defined missing ratios of 0.3, 0.5, 0.7, indicating the capability of learning the mask distribution.

Learning the mask distribution is useful where there are quality issues with the data, such as when the data is polluted or has incomplete entries. A data structure representing the learned mask distribution can be provided to downstream machine learning mechanisms to request improvements or to identify areas in the data which need to be rectified.

Experiment—Multi-Modal Data

Baltrusaitis et al. defined multi-modal data as data including multiple modalities, where each modality is a way to sense the world—seeing objects, hearing sounds, feeling texture, etc. However, here the definition of multi-modality covers a wider spectrum where the data could be of the same type (e.g., image) but come from different distributions (e.g., different shapes).

By the manner multi-modal data are collected or represented, Applicants can safely treat multi-modal data (typically high-dimensional) as type of heterogeneous data.

In the following text, Applicants use attribute and modality interchangeably as a notion of heterogeneity in data.

Applicants design experiments on three types of multi-modal data: i) image and label pair—Applicants choose Fashion MNIST images and labels; ii) image and image pair—Applicants synthesize bimodal MNIST+MNIST datasets by pairing two different digits from MNIST as rules $\{(0,9),(1,8),(2,7),(3,6),(4,5)\}$; iii) standard multi-modal dataset CMU-MOSI including visual, textual and acousitic signals.

For all datasets, Applicants use the standard training, validation and test split. In multi-modal experiments, all masking follows MCAR. Applicants evaluate the performance of label with PFC (proportion of falsely classified attributes), images from MNIST and FashionMNIST with MSE (mean-squared error) averaged over pixel dimensions and other attributes with MSE.

Experiment—Data Imputation on Multi-Modal Datasets

Table 3 demonstrates VSAE can achieve superior performance for multi-modal data imputation task on all modalities with lower variance.

Figure 5:
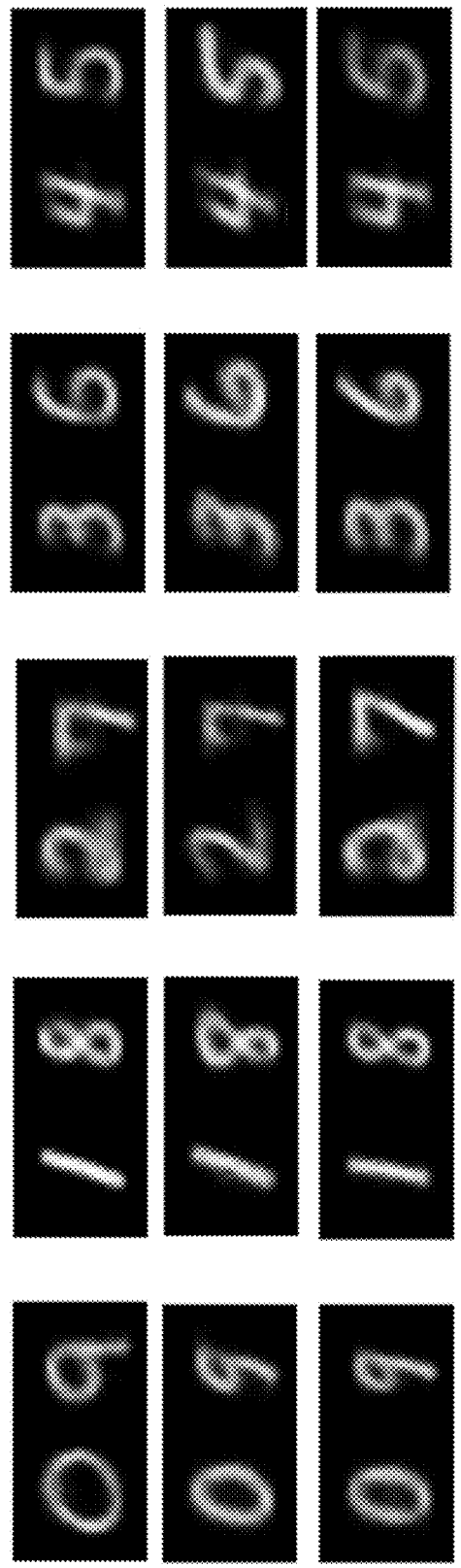
FIG. 5 is an example of data imputation on MNIST+ MNIST.

FIG. 5 is a diagram 500 that presents the qualitative results of imputations on MNIST+MNIST image pair. To demonstrate the robustness to the missing ratios, Applicants conducted experiments with missing ratio of 0.3, 0.5, 0.7 on synthetic MNIST+MNIST dataset.

In FIG. 5, the middle row is the observed attribute with corresponding labels of unobserved digit given in the top row following the pre-defined rules. The bottom row shows the imputation of unobserved attribute from VSAE using the system 100.

For different missing ratios, the sum errors (sum of error of two modalities) on MNIST+MNIST of the model are 0.1371±0.0001, 0.1376±0.0002 and 0.1379±0.0001 under each missing ratio respectively.

This indicates that VSAE from the system 100 also stays robust under different missing ratios for multi-modal datasets.

TABLE 3

Data Imputation on multi-modal datasets. Missing ratio is 0.5 on all datasets. We evaluate each datasets w.r.t each attribute-label attribute is evaluated by PFC, image attributes of MNIST and FashionMNIST ate evaluated by MSE averaged over pixels, other attributes are evaluated by MSE. Lower is better for all. We show mean and standard deviation over 3 independent runs. $\Delta < 0.001$.

| | FashionMNIST + label (PFC) | | MNIST + MNIST | | CMU-MOSI | | |
|---|---|---|---|---|---|---|---|
| | Image | Label | Digit-1 | Digit-2 | Text | Audio | Image |
| AE | 0.1105 ± 0.001 | 0.366 ± 0.01 | 0.1077 ± $\Delta$ | 0.1070 ± $\Delta$ | 0.035 ± 0.003 | 0.224 ± 0.025 | 0.019 ± 0.003 |
| VAE | 0.0885 ± $\Delta$ | 0.411 ± 0.01 | 0.0784 ± $\Delta$ | 0.0682 ± $\Delta$ | 0.034 ± $\Delta$ | 0.202 ± 0.008 | 0.017 ± $\Delta$ |
| CVAE w/mask | 0.0887 ± $\Delta$ | 0.412 ± 0.01 | 0.0733 ± $\Delta$ | 0.0670 ± $\Delta$ | 0.043 ± $\Delta$ | 0.257 ± 0.002 | 0.020 ± $\Delta$ |
| MVAE | 0.1402 ± 0.026 | 0.374 ± 0.07 | 0.0760 ± $\Delta$ | 0.0802 ± $\Delta$ | 0.44 ± $\Delta$ | 0.213 ± 0.001 | 0.025 ± $\Delta$ |
| HI-VAE | 0.1575 ± 0.006 | 0.405 ± 0.01 | 0.0772 ± $\Delta$ | 0.0725 ± $\Delta$ | 0.047 ± $\Delta$ | 0.211 ± 0.005 | 0.0267 ± $\Delta$ |
| VSAE (ours) | 0.0874 ± $\Delta$ | 0.356 ± 0.01 | 0.0712 ± $\Delta$ | 0.0663 ± $\Delta$ | 0.033 ± $\Delta$ | 0.200 ± $\Delta$ | 0.017 ± $\Delta$ |

Applicants hypothesize that the underlying mechanism of selective proposal distribution benefits the performance. The separate structure of attributive proposal network and collective proposal network enforces the system 100 to attend to the observed attributes, by limiting the input of attributive proposal network to single observed attribute. Thus it shows consistent robustness to various missing ratios.

In contrast, baseline methods primarily approximate the posterior by one single proposal distribution inferred straight from the whole input. The system 100 is configured to readily ignore noisy unobserved attributes and attends on useful observed attributes, while baselines rely heavily on neural networks to extract expressive information from the whole data, which is dominated by missing even deleterious information in case of high missing ratio.

Under partially-observed training setting, unobserved attributes are not available even during training. However, the unobserved attribute in one data sample could be the observed attribute in another. Thus, the collective proposal networks are able to construct the mapping from observable to unobservable information among the whole training set.

Experiment—Data Generation

Figure 6:
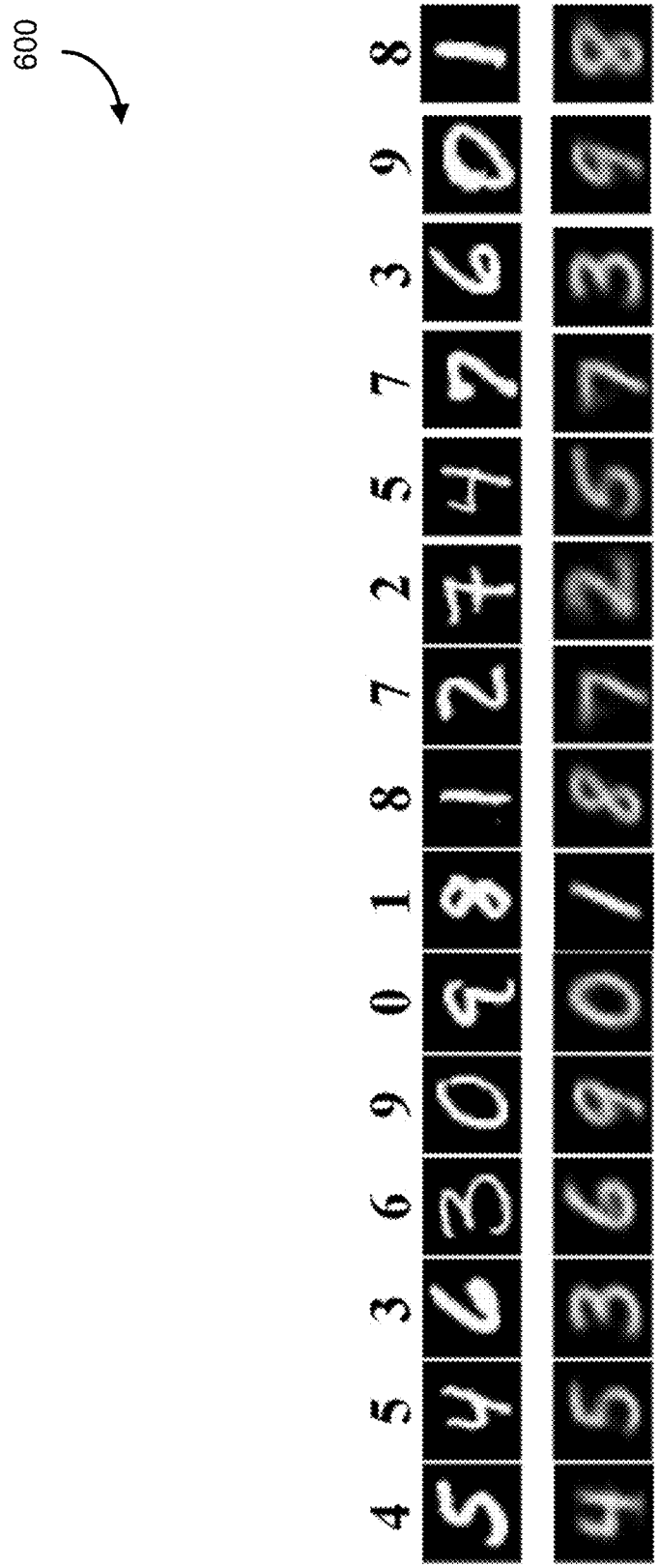
FIG. 6 is an example of generated samples without conditional information on MNIST+MNIST. As shown, the correspondence between attributes (defined pairs) are preserved in stochastic data generative process.

FIG. 6 is a diagram 600 that shows that the system 100 is capable of generating image-based attributes following the underlying correlation defined as pairs of digits. The learning process does not require any supervision, as furthermore, training can be effectively carried out with only access to partially-observed data.

Applicants find improvement on the performance by conditioning the reconstructed mask variable on the data decoders. Applicants speculate that this may be because the mask variable can inform the data decoder of the missingness distributed in the data space, which in turn allows the potential missing mechanism to guide the data generative process.

Findings

As noted above, Applicants propose an improved machine learning architecture as shown in the example of system 100, a novel latent variable model to learn from partially-observed heterogeneous data. The proposed data model architecture utilizes computational neural networks, in some embodiments, that are adapted through the topology to handle the missingness effectively and elegantly by introducing a selective proposal distribution which is factorized w.r.t. the attributes in data.

Further, unlike most prior work focusing on a single task, the system 100 as a framework, is capable of performing multiple tasks including data imputation, data generation and mask generation.

Applicants summarize the contributions within the partially-observed heterogeneous setting as follows.

Heterogeneity. It is tackled by a factorized latent space w.r.t attributes which reduces the negative mutual interference because of the heterogeneity in the raw data space.

Partial observations. The system 100 approximates the true posterior with a novel selective proposal distribution. The automatic encoder selection between observed and unobserved attributes enables system 100 to learn from partial observations during training and ignore noisy information from unobserved attributes.

No MCAR assumption. The independence assumption between data and mask is restrictive and not presumably true in all applications. The system 100 does not require this assumption and models the joint distribution of data and mask together, although in some embodiments, the system 100 can operate with input data that has data MCAR.

Applicants conducted experiments on partially-observed heterogeneous data with comparison to the state-of-the-art deep latent variable models under different missing mechanisms. Extensive experiments demonstrated the effectiveness of a proposed VSAE approach using system 100 on a variety of tasks.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Figure 3:
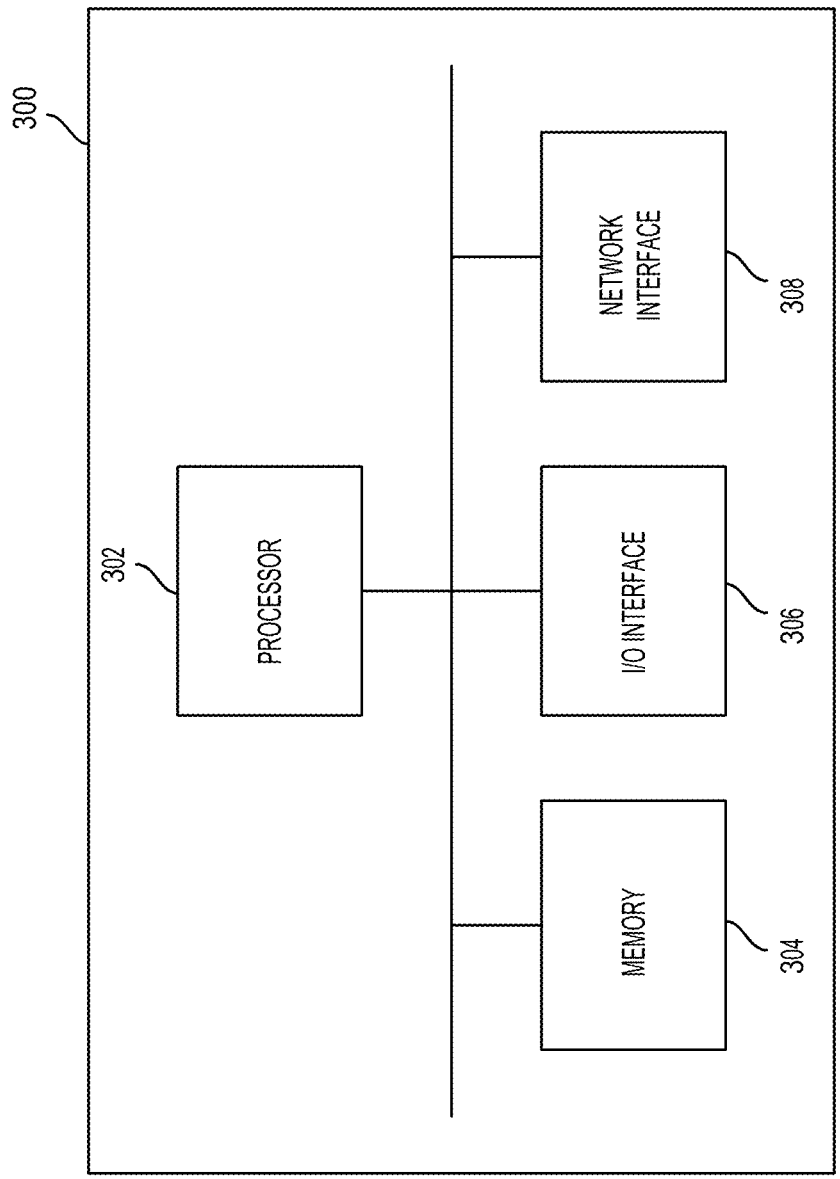
FIG. 3 is a block schematic of an example computing device, according to some embodiments.

FIG. 3 is a diagram of an example computing device 300, according to some embodiments. As depicted, computing device 300 includes at least one processor 302, memory 304, at least one I/O interface 306, and at least one network interface 308.

Each processor 302 may be, for example, microprocessors or microcontrollers, a digital signal processing (DSP) processor, an integrated circuit, a field programmable gate array (FPGA), a reconfigurable processor, a programmable read-only memory (PROM), thereof.

Memory 304 may include computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 306 enables computing device 300 to interconnect with one or more input devices, such as a keyboard, mouse, camera, touch screen and a microphone, or with one or more output devices such as a display screen and a speaker.

Each network interface 308 enables computing device 300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WMAX), SS7 signaling network, fixed line, local area network, wide area network, and others, including any combination of these. The system can be interoperated with, for example, through various application programming interfaces (APIs), whereby data sets are provided through upload or data stream and an output data set is returned. The output data set can be imputed data, or an output mask data set.

Commercial Variations

For example, in the context of a financial services data implementation, incomplete client information can be received as a comma separated values (CSV) file. The data can be incomplete, for example, because the user banks with multiple banks, or has information stored in other departments whose information is not accessible. The provided output can be a filled in CSV file, where, for example, imputed information is utilized to complete the data set. In some embodiments, the imputed information is flagged (e.g., using metadata or an associated dimension) to distinguish it from the observed information. In some further embodiments, the flagging includes associating a confidence score. In another example, an incomplete database can be completed and similarly, the confidence score or a flag can be appended by way of adding a new row or column.

In this example, there may be 100 clients, where there is complete income data from 2002 to 2019, but for some clients, 2020 income data is missing. All of the information for each client can be concatenated, and converted into a vector. The input data can be, for example, converted into CSV, provided to the model and completed with imputed information. Accordingly, for a downstream machine learning system, a complete data set with a combination of the original observed data along with the imputed data can be provided for conducting machine learning training, etc. Similarly, downstream analytical services can conduct analysis using the completed data set.

In another example, the system can be used in relation to caption generation. In this example, captions are provided in relation to parts of a video but not for the rest of the video. This example relates to multimodal data. In this example, there are different modes, such as image, text, sound, etc. The system can impute the rest of the captions that were not observed, for example, by using information from other modalities (video data, such as "the cat is walking across the screen", or speech in the audio channel. In this example, the generation of imputed data can be used to reduce an overall cost for generating labels or annotations where it can be fairly time intensive or costly to prepare.

Another example of multimodal imputation can include usage with Fashion MNIST, where data is incomplete (e.g., given an image, a label can be generated or vice versa).

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

APPENDIX

Model Architecture

In all models, all the layers are modeled by MLP. To fairly conduct a comparison, every method is implemented with same backbone networks with comparable volume of parameters (the model has same or slightly smaller number of parameters compared to other baselines). Basically, the attributive proposal networks take single attribute of data vector as input to infer the attributive proposal distribution; the collective proposal network takes the observed data vectors and mask vector (simple concatenation is used here) as as input to infer the collective proposal distributions. The input vector to collective proposal network should have same length for the neural network. Here Applicants concatenate all attribute vectors and replace the unobserved attribute vectors with some standard normal noise. Note that all the baselines has encoders/decoders with same or larger number of parameters than the method. Applicants implement the model using PyTorch. The experiments were conducted on one Tesla P100 and one GeForce GTX 1080.

Encoders

Attributive proposal networks. In the UCI repository experiment, the attributive encoders for numerical data are modeled by 3-layer 16-dim MLPs and the attributive encoders for categorical data are modeled by 3-layer 64-dim MLPs, all followed by Batch Normalization and Leaky ReLU nonlinear activations.

In the MNIST+MNIST experiment, the attributive encoders are modeled by 3-layer 128-dim MLPs followed by Leaky ReLU nonlinear activations.

In the MNIST+SVHN bimodal experiment, the unimodal encoders are modeled by 3-layer 512-dim MLPs followed by Leaky ReLU nonlinear activations.

Applicants set the latent dimension as 20-dim for every attributes in UCI repository experiments and 256-dim for every attribute in other experiments.

UCI data unimodal encoder: Linear(1,64)→BatchNorm1d(64)→LeakyReLU→Linear(64,64)→LeakyReLU→Linear(64,64)→LeakyReLU→Linear(64, 20);

MNIST+MNIST synthetic unimodal encoder: Linear (data-dimension, 128)→LeakyReLU→Linear(128,128)→LeakyReLU→Linear(128,128)→LeakyReLU→Linear(128,256);

MNIST+SVHN synthetic unimodal encoder: Linear(data-dimension, 512)→LeakyReLU→Linear(512,512)→LeakyReLU→Linear(512,512)→LeakyReLU→Linear(512,256);

Collective proposal networks. In general, any model capable of domain fusion can be used here to map the observed data $x_o$ and the mask m to the latent variables z. One may also use techniques to input a set of attributes. However, in this paper, Applicants simply use an architecture similar to attributive encoders. The difference is that the input to attributive encoders are lower dimensional vectors of an individual attribute. But, the input to the collective encoders is the complete data vector with unobserved attributes replaced with noise or zeros.

As the input to the collective encoders is the same for all attributes (i.e., $q(z_i|_o, m) \forall i$), Applicants model the collective encoders as one single encoder to take advantage of the parallel matrix calculation speed. Thus the collective encoder for every experiment has the same structure as its attributive encoder but with full-dimensional input.

Aggregator

In the models, Applicants use vector concatenation as the way of aggregating to get an integral representation of the shared latent variables.

Decoders

Mask Decoder. Applicants feed the output of the latent variable aggregation to the mask decoder first. Then the output of mask decoder will be an extra condition of data decoder. UCI mask decoder: Linear(20*data-dimension, 64)→BatchNorm1d(64)→LeakyReLU→Linear(64,64)→LeakyReLU→Linear(64,64)→LeakyReLU→Linear(64, mask-dimension)→Sigmoid;

MNIST+MNIST synthetic mask decoder: Linear(512,16)→BatchNorm1d(16)→LeakyReLU→Linear(16,16)→LeakyReLU→Linear(16,16)→LeakyReLU→Linear(16, 2)→Sigmoid;

MNIST+SVHN synthetic mask encoder: Linear(512,16)→BatchNorm1d(16)→LeakyReLU→Linear(16,16)→LeakyReLU→Linear(16,16)→LeakyReLU→Linear(16, 2)→Sigmoid;

Data Decoder

As the output is factorized over attributes and for every decoder the input is shared as the latent codes sampled from the selective proposal distribution. Applicants find the performance is comparable if Applicants use a single decoder for all data generative network (then slice the output of this decoder to get output of each attribute) or use factorized data generative networks with multiple separate decoders, as long as the parameters are set to be comparable.

UCI data decoder: Linear(20*data-dimension, 128)→BatchNorm1d(128)→LeakyReLU→Linear(128)→Linear(128, 128)→Linear(128, data-dimension);

MNIST+MNIST synthetic data decoder: Linear(512,128)→BatchNorm1d(128)→LeakyReLU→Linear(128,128)→Linear(128, 128)→Linear(128,784)→Sigmoid;

MNIST+SVHN synthetic mask encoder: Linear(512,512)→BatchNorm1d(512)→LeakyReLU→Linear(512,512)→Linear(512,512)→Linear(512,784/3072)→Sigmoid;

Training

In some experiments, Applicants use Adam optimizer for all models. For UCI numerical, mixed and CMU-MOSI experiment, learning rate is 1e-3 and use validation set to find a best model in 1000 epochs. For UCI categorical experiment, learning rate is 1e-2 and use validation set to find a best model in 1000 epochs. For MNIST+MNIST, FashionMNIST+label experiments, learning rate is 1e-4 and use validation set to find a best model in 1000 epochs. All modules in the models are trained jointly.

In the model, Applicants determined the conditional log-likelihood of unobserved modality by generating corresponding attributes from prior. Applicants initially train the model for some (empirically Applicants choose 20) epochs without calculating the conditional log-likelihood of $x_u$. And then first feed the partially-observed data to the model and generate the unobserved modality $x_u$ without calculating any loss; then feed the same batch for another pass, calculate the conditional log-likelihood using real $x_o$ and generated $x_u$ as ground truth.

Baselines

In the experiments, all the baselines use the same backbone architecture as the model, and the some of the layers are widened to make the total number of parameters same as (or marginally more than) the proposed model. All baselines for each experiment are trained with same Adam optimizer with same learning rate. All the deep latent variable model baselines have same size of latent variables.

In the setting of AE/VAE, the input is the whole data representation with all the attributes without any mask information; In CVAE w/mask, the encoder and decoder are both conditioned on the mask vector, while in CVAE w/data, the observed modalities are fed to encoder and the decoder is conditioned on the observed modalities. MVAE and HI-VAE implementation are borrowed from the public code, with changes of the latent space size to achieve fair comparison.

Additional Experimental Results

Applicants include some supplementary experimental results in this section.

MNIST+MNIST Dataset

Applicants randomly pair two digits in MNIST as {(0,9), (1,8),(2,7),(3,6),(4,5)}. The training/test/validation sets respectively contain 23257/4832/5814 samples.

For more quantitative results, please refer to Table 4.

TABLE 4

Data Imputation on MNIST + MNIST under different missing ratios. Missing ratio is 0.3, 0.5 and 0.7. Evaluated by sum error two attributes. We show mean and standard deviation over 3 independent runs. Lower is better.

|  | 0.3 | 0.5 | 0.7 |
| --- | --- | --- | --- |
| AE | 0.2124 ± 0.0012 | 0.2147 ± 0.0008 | 0.2180 ± 0.0008 |
| VAE | 0.1396 ± 0.0002 | 0.1416 ± 0.0001 | 0.1435 ± 0.0006 |
| CVAE w/mask | 0.1393 ± 0.0002 | 0.1412 ± 0.0006 | 0.1425 ± 0.0012 |
| MVAE | 0.1547 ± 0.0012 | 0.1562 ± 0.0003 | 0.1579 ± 0.0006 |
| VSAE | 0.1371 ± 0.0001 | 0.1376 ± 0.0002 | 0.1379 ± 0.0001 |

Data Imputation on MNIST+MNIST under different missing ratios. Missing ratio is 0.3, 0.5 and 0.7. Evaluated by sum error of two attributes. Applicants show mean and standard deviation over 3 independent runs. Lower is better.

Figure 7:
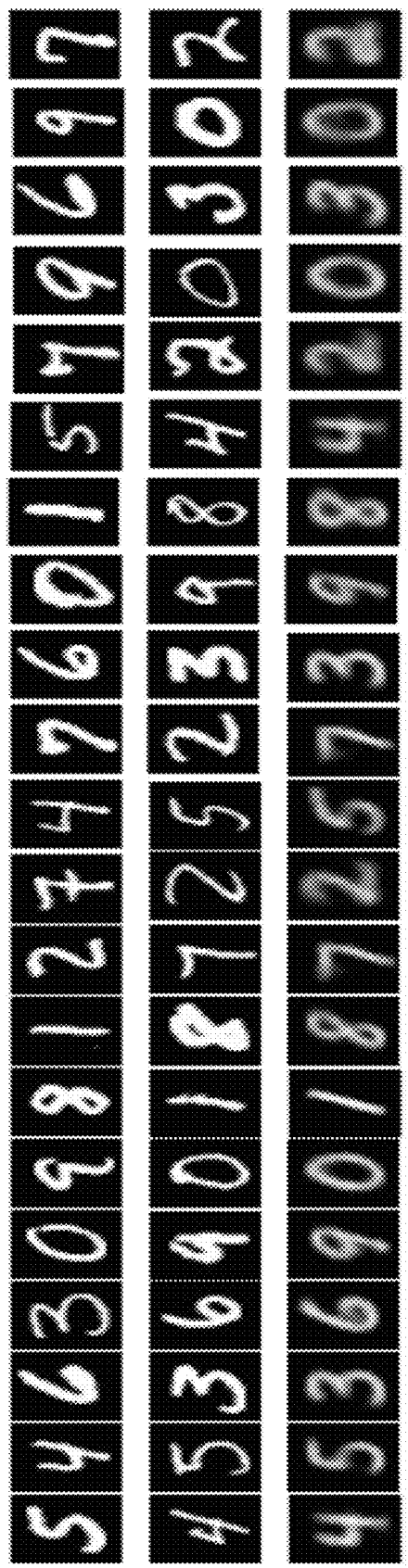
FIG. 7 is a diagram showing imputation on MNIST+ MNIST, according to some embodiments.

FIG. 7 is a diagram 700 showing imputation on MNIST+MNIST, according to some embodiments. Top row visualizes observed attribute, middle row unobserved attribute, and bottom row shows the imputation of unobserved attribute from VSAE.

Figure 8:
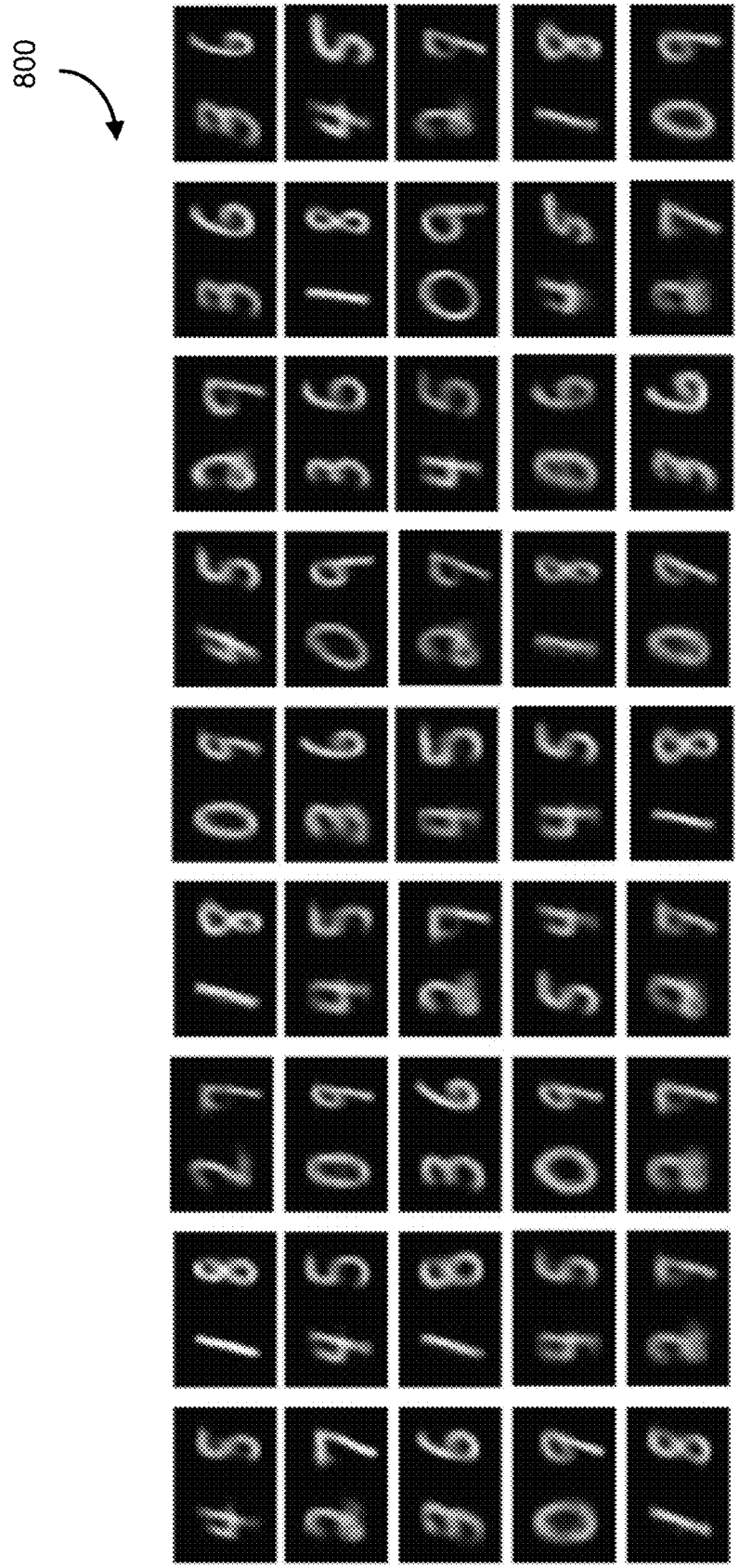
FIG. 8 is a diagram showing generation on MNIST+ MNIST where there are generated samples w/o conditional information, according to some embodiments.

FIG. 8 is a diagram 800 showing generation on MNIST+MNIST where there are generated samples w/o conditional information, according to some embodiments. As shown, the correspondence between modalities (pre-defined pairs) are preserved while generation.

Figure 9:
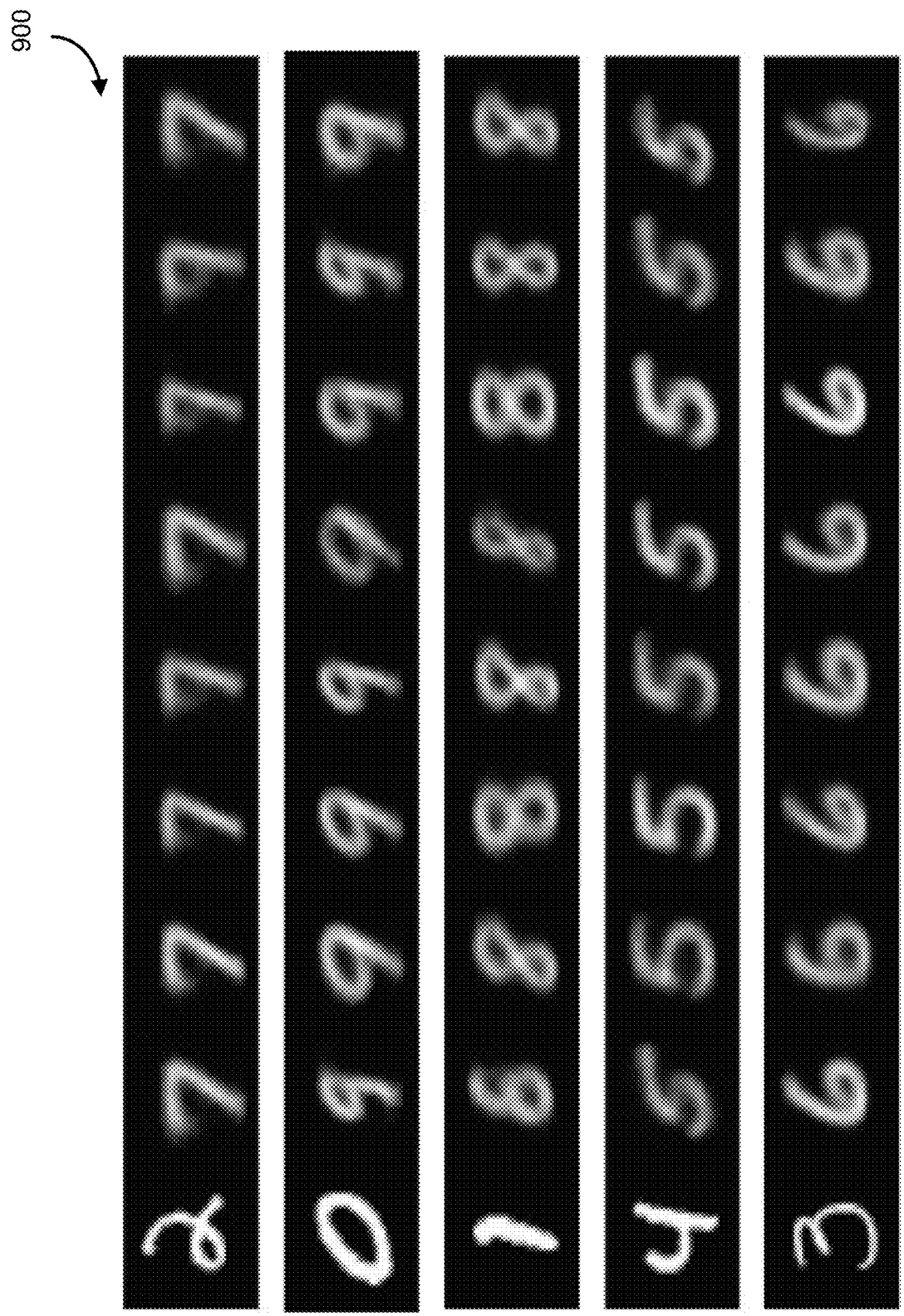
FIG. 9 is a diagram showing multiple independent sampling in selected latent space, according to some embodiments.

FIG. 9 is a diagram 900 showing multiple independent sampling in selected latent space, according to some embodiments. The leftmost digits are observed images in ground truth, and the right 8 digits are imputations of corresponding unobserved digits.

Please see FIG. 7 for more imputation based on observed attributes, see FIG. 8 for more generation from parameter-free prior. FIG. 9 shows imputation results form multiple independent samplings, given observed attributes.

MNIST+SVHN Dataset

This is another similar synthesized dataset as MNIST+MNIST. Applicants pair one digit in MNIST with the random same digit in SVHN. The training/test/validation sets respectively contain 44854/10000/11214 samples. For both datasets, Applicants synthesize mask vectors over each modality by sampling from Bernoulli distribution. All mask are fixed after synthesis process. All original data points are only used once.

Please refer to Table 5 for the attribute-wise imputation performance; Table 6 for the imputation performance under different missing ratios.

TABLE 5

Data Imputation on MNIST + SVHN. Missing ratio is 0.5. Evaluated by MSE. We show mean and standard deviation over 3 independent runs. Lower is better.

|  | MNIST-MSE/784 | SVHN-MSE/3072 | Sum error |
| --- | --- | --- | --- |
| AE | 0.0867 ± 0.0001 | 0.1475 ± 0.0006 | 0.2342 ± 0.0007 |
| VAE | 0.0714 ± 0.0001 | 0.0559 ± 0.0027 | 0.1273 ± 0.0003 |
| CVAE w/mask | 0.0692 ± 0.0001 | 0.0558 ± 0.0003 | 0.1251 ± 0.0005 |
|  | 0.0707 ± 0.0003 | 0.0602 ± 0.0001 | 0.1309 ± 0.0005 |
| MVAE | 0.0682 ± 0.0001 | 0.0516 ± 0.0001 | 0.1198 ± 0.0001 |
| VSAE |  |  |  |

TABLE 6

Data Imputation on MNIST + SVHN under different missing ratios. Missing ratio is 0.3, 0.5 and 0.7. Evaluated by sum error of two modalities. We show mean and standard deviation over 3 independent runs. Lower is better.

|  | 0.3 | 0.5 | 0.7 |
| --- | --- | --- | --- |
| AE | 0.1941 ± 0.0006 | 0.2342 ± 0.0007 | 0.2678 ± 0.0012 |
| VAE | 0.1264 ± 0.0001 | 0.1273 ± 0.0003 | 0.1322 ± 0.0005 |
| CVAE w/mask | 0.1255 ± 0.0002 | 0.1251 ± 0.0005 | 0.1295 ± 0.0006 |
| MVAE | 0.1275 ± 0.0029 | 0.1309 ± 0.0005 | 0.1313 ± 0.0013 |
| VSAE | 0.1217 ± 0.0002 | 0.1198 ± 0.0001 | 0.1202 ± 0.0002 |

UCI Repository Datasets

Besides the results in the main manuscript, Applicants include more experimental results of mixed datasets (refer to Table 7).

TABLE 7

Data Imputation on mixed UCI datasets. Missing ratio is 0.5. We evaluate each datasets w.r.t each attribute—categorical attributes are evaluated by PFC, numerical attributes are evaluated by NRMSE. We show mean and standard deviation over 3 independent runs. Lower is better for all.

|  | Servo (mixed) | | Contraceptive Method (mixed) | |
| --- | --- | --- | --- | --- |
| Attribute type | categorical | numerical | categorical | numerical |
| AE | 0.825 ± 0.008 | 0.624 ± 0.001 | 0.716 ± 0.021 | 0.579 ± 0.003 |
| VAE | 0.829 ± 0.030 | 0.677 ± 0.0003 | 0.708 ± 0.022 | 0.562 ± 0.001 |
| CVAE w/mask | 0.776 ± 0.015 | 0.622 ± 0.024 | 0.708 ± 0.012 | 0.568 ± 0.013 |
| MVAE | 0.837 ± 0.074 | 0.631 ± 0.005 | 0.659 ± 0.011 | 0.558 ± 0.003 |
| HI-VAE | 0.822 ± 0.025 | 0.655 ± 0.032 | 0.712 ± 0.018 | 0.579 ± 0.009 |
| VSAE (ours) | 0.773 ± 0.016 | 0.603 ± 0.001 | 0.623 ± 0.021 | 0.541 ± 0.005 |

Image+Label Experiment
See Table 8 for details.

TABLE 8

Data Imputation on Image + label datasets. Missing ratio is 0.5. Image and label attribute are evaluated by MSE and PRC respectively. We show mean and standard deviation over 3 independent runs (lower is better). $\Delta < 0.01$.

|  | FashionMNIST | | MNIST | |
| --- | --- | --- | --- | --- |
|  | image (MST) | label (PFC) | image (MSE) | label (PFC) |
| AE | 0.1104 ± 0.001 | 0.366 ± $\Delta$ | 0.0700 ± $\Delta$ | 0.406 ± $\Delta$ |
| VAE | 0.0885 ± $\Delta$ | 0.411 ± $\Delta$ | 0.0686 ± $\Delta$ | 0.406 ± 0.01 |
| CVAE w/mask | 0.0887 ± $\Delta$ | 0.412 ± $\Delta$ | 0.0686 ± $\Delta$ | 0.419 ± $\Delta$ |
| MVAE | 0.1402 ± 0.002 | 0.374 ± 0.07 | 0.2276 ± 0.002 | 0.448 ± $\Delta$ |
| VSAE (ours) | 0.0874 ± $\Delta$ | 0.356 ± $\Delta$ | 0.0681 ± $\Delta$ | 0.397 ± 0.01 |

Multi-Modal Experiment

See Table 9 and Table 10, Applicants include additional experiments on multi-modal datasets to demonstrate the general effectiveness of the model. Applicants choose the datasets following MVAE and MFM. Applicants choose CMU-MOSI and ICT-MMMO. CMU-MOSI (Zadeh et al., 2016) is a collection of 2199 monologue opinion video clips annotated with sentiment. ICT-MMMO (Wallmer et al., 2013) consists of 340 online social review videos annotated for sentiment. Applicants train all the models using Adam optimizer with learning rate of 1e-3.

TABLE 9

Data and Imputation oil CMU-MOSI. Missing ratio is 0.5 Evaluated by MSE of each attribute. We show mean and standard deviation over 3 independent runs (lower is better). $\Delta < 0.0005$.

|  | Textual-MSE | Acoustic-MSE | Visual-MSE |
| --- | --- | --- | --- |
| AE | 0.035 ± 0.003 | 0.224 ± 0.025 | 0.019 ± 0.003 |
| VAE | 0.034 ± $\Delta$ | 0.202 ± $\Delta$ | 0.1273 ± $\Delta$ |
| CVAE w/mask | 0.043 ± $\Delta$ | 0.257 ± 0.002 | 0.020 ± $\Delta$ |
| MVAE | 0.044 ± $\Delta$ | 0.213 ± 0.001 | 0.025 ± $\Delta$ |
| VSAE | 0.033 ± $\Delta$ | 0.200 ± $\Delta$ | 0.017 ± $\Delta$ |

TABLE 10

Data Imputation on ICT-MMMO. Missing ratio is 0.5. Evaluated by MSE of each attribute. We show mean and standard deviation over 3 independent runs (lower is better). $\Delta < 0.0001$.

|  | Acoustic-MSE | Visual-MSE | Textual-MSE |
| --- | --- | --- | --- |
| AE | 0.1211 ± 0.0013 | 0.00502 ± $\Delta$ | 0.366 ± 0.001 |
| VAE | 0.0407 ± 0.0005 | 0.00500 ± $\Delta$ | 0.293 ± 0.001 |
| CVAE w/mask | 0.0396 ± 0.0042 | 0.00492 ± $\Delta$ | 0.295 ± 0.001 |
| MVAE | 0.1126 ± 0.0757 | 0.00485 ± $\Delta$ | 0.405 ± 0.002 |
| VSAE | 0.0381 ± 0.0027 | 0.00485 ± $\Delta$ | 0.243 ± $\Delta$ |

What is claimed is:

1. A computer implemented system for conducting machine learning using partially-observed data by using a variational selective auto-encoder (VSAE) machine learning model framework, the system including a processor operating in conjunction with computer memory, the system comprising:
the processor configured to provide:
a data receiver adapted to receive one or more data sets representative of the partially-observed data, each having a subset of observed data and a subset of unobserved data, the data receiver configured to extract a mask data structure from each data set of the one or more data sets representative of which modalities are observed and which modalities are unobserved; and
a machine learning data architecture engine adapted to:
maintain a attributive proposal network for processing the one or more data sets, the attributive proposal network including a set of individual encoders, each individual encoder adapted for a corresponding observed modality;
maintain a collective proposal network for processing the corresponding mask data structure, the collective proposal network including a collective encoder corresponding to all of the unobserved modalities, the mask data structure utilized for conditional selection of a proposal distribution for an unobserved modality; and
maintain a first generative network including a first set of one or more decoders, each decoder of the first set of the one or more decoders configured to generate output estimated data proposed by the attributive proposal network and the collective proposal network wherein, for the unobserved modalities, expectation over collective observation from the collective proposal network is applied as a corresponding proposal distribution as an approximation of a true posterior distribution based on the mask data structure such that a joint distribution of all attributes and mask data structure can be learned from the partially-observed data.

2. The system of claim 1, wherein the attributive proposal network, the collective proposal network, and the generative network are trained together jointly.

3. The system of claim 1, wherein the partially-observed data is heterogeneous data.

4. The system of claim 1, wherein the output estimated data includes estimated values corresponding to at least one unobserved modality and the output estimated data can be combined with the partially-observed data.

5. The system of claim 1, wherein the output estimated data is a new set of generated data sets.

6. The system of claim 1, wherein the one or more data sets representative of the partially-observed data includes high-dimensional data.

7. The system of claim 1, wherein the one or more data sets representative of the partially-observed data includes low dimensional tabular data.

8. The system of claim 1, wherein the mask data structure is an array of Boolean variables, each Boolean variable having a corresponding modality.

9. The system of claim 1, wherein the machine learning data architecture engine is further adapted to maintain a second generative network including a second set of one or more decoders, each decoder of the second set of the one or more decoders configured to generate new masks that can be applied to the output estimated data such that the masked output estimated data approximates a level of masking in the received one or more data sets.

10. The system of claim 9, wherein the output estimated data is a new set of generated data sets and the new masks, each of the new masks having a corresponding data set such that each of the new masks can be used to identify a first subset of modalities as observed and a second subset of modalities as unobserved.

11. A computer implemented method for conducting machine learning using partially-observed data, the method comprising:

receiving one or more data sets representative of the partially-observed data, each having a subset of observed data and a subset of unobserved data by using a variational selective auto-encoder (VSAE) machine learning model framework, the data receiver configured to extract a mask data structure from each data set of the one or more data sets representative of which modalities are observed and which modalities are unobserved; and maintaining a attributive proposal network for processing the one or more data sets, the attributive proposal network including a set of individual encoders, each individual encoder adapted for a corresponding observed modality;

maintaining a collective proposal network for processing the corresponding mask data structure, the collective proposal network including a collective encoder corresponding to all of the unobserved modalities, the mask data structure utilized for conditional selection of a proposal distribution for an unobserved modality; and maintaining a first generative network including a first set of one or more decoders, each decoder of the first set of the one or more decoders configured to generate output estimated data proposed by the attributive proposal network and the collective proposal network wherein, for the unobserved modalities, expectation over collective observation from the collective proposal network is applied as a corresponding proposal distribution as an approximation of a true posterior distribution based on the mask data structure such that a joint distribution of all attributes and mask data structure can be learned from the partially-observed data.

12. The method of claim 11, wherein the attributive proposal network, the collective proposal network, and the generative network are trained together jointly.

13. The method of claim 11, wherein the partially-observed data is heterogeneous data.

14. The method of claim 11, wherein the output estimated data includes estimated values corresponding to at least one unobserved modality and the output estimated data can be combined with the partially-observed data.

15. The method of claim 11, wherein the output estimated data is a new set of generated data sets.

16. The method of claim 11, wherein the one or more data sets representative of the partially-observed data includes high-dimensional data.

17. The method of claim 11, wherein the one or more data sets representative of the partially-observed data includes low dimensional tabular data.

18. The method of claim 11, wherein the machine learning data architecture engine is further adapted to maintain a second generative network including a second set of one or more decoders, each decoder of the second set of the one or more decoders configured to generate new masks that can be applied to the output estimated data such that the masked output estimated data approximates a level of masking in the received one or more data sets.

19. The method of claim 18, wherein the output estimated data is a new set of generated data sets and the new masks, each of the new masks having a corresponding data set such that each of the new masks can be used to identify a first subset of modalities as observed and a second subset of modalities as unobserved.

20. A non-transitory computer readable medium storing machine interpretable instructions, which when executed, cause a processor to perform a computer implemented method for conducting machine learning using partially-observed data by using a variational selective auto-encoder (VSAE) machine learning model framework, the method comprising:

receiving one or more data sets representative of the partially-observed data, each having a subset of observed data and a subset of unobserved data, the data receiver configured to extract a mask data structure from each data set of the one or more data sets representative of which modalities are observed and which modalities are unobserved; and maintaining a attributive proposal network for processing the one or more data sets, the attributive proposal network including a set of individual encoders, each individual encoder adapted for a corresponding observed modality;

maintaining a collective proposal network for processing the corresponding mask data structure, the collective proposal network including a collective encoder corresponding to all of the unobserved modalities, the mask data structure utilized for conditional selection of a proposal distribution for an unobserved modality; and maintaining a first generative network including a first set of one or more decoders, each decoder of the first set of the one or more decoders configured to generate output estimated data proposed by the attributive proposal network and the collective proposal network wherein, for the unobserved modalities, expectation over collective observation from the collective proposal network is applied as a corresponding proposal distribution as an approximation of a true posterior distribution based on the mask data structure such that a joint distribution of all attributes and mask data structure can be learned from the partially-observed data.

* * * * *